United States Patent
Golitschek Edler von Elbwart et al.

(10) Patent No.: US 10,701,673 B2
(45) Date of Patent: *Jun. 30, 2020

(54) CHANNEL QUALITY INFORMATION REPORTING FOR SUBFRAMES

(71) Applicant: Sun Patent Trust, New York, NY (US)

(72) Inventors: Alexander Golitschek Edler von Elbwart, Darmstadt (DE); Masayuki Hoshino, Kanagawa (JP)

(73) Assignee: Sun Patent Trust, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/141,367

(22) Filed: Sep. 25, 2018

(65) Prior Publication Data

US 2019/0029014 A1    Jan. 24, 2019

Related U.S. Application Data

(63) Continuation of application No. 15/491,685, filed on Apr. 19, 2017, now Pat. No. 10,117,230, which is a (Continued)

(30) Foreign Application Priority Data

Aug. 12, 2011    (EP) .................................... 11006651

(51) Int. Cl.
*H04W 72/04*    (2009.01)
*H04L 1/00*    (2006.01)
(Continued)

(52) U.S. Cl.
CPC ...... *H04W 72/0413* (2013.01); *H04B 7/0626* (2013.01); *H04J 13/00* (2013.01);
(Continued)

(58) Field of Classification Search
None
See application file for complete search history.

(56) References Cited

U.S. PATENT DOCUMENTS 8,654,745 B2    2/2014    Kwon et al.
8,953,475 B2 *  2/2015    Li .................... H04J 11/0023
                                                              370/252
(Continued)

FOREIGN PATENT DOCUMENTS

EP          2 337 413 A1     6/2011
JP          2009-049540 A    3/2009
(Continued)

OTHER PUBLICATIONS

3GPP TS 25.214 V9.6.0, "$3^{rd}$ Generation Partnership Project; Technical Specification Group Radio Access Network; Physical layer procedures (FDD) (Release 9)," Jun. 2011, 99 pages.
(Continued)

*Primary Examiner* — Xavier S Wong
(74) *Attorney, Agent, or Firm* — Seed IP Law Group LLP

(57) ABSTRACT

The present invention relates to reporting the channel state information in a communication system. The channel state information is reported from the user terminal to a base station. Accordingly, the user terminal determines a first channel state information value from a first set of values (levels) and a second channel state information value from another set of values, preferably a larger set of values. Then a difference or other relative measure is calculated between the first and the second channel state information value and transmitted to the base station.

18 Claims, 8 Drawing Sheets

Related U.S. Application Data continuation of application No. 14/237,742, filed as application No. PCT/EP2012/065723 on Aug. 10, 2012, now Pat. No. 9,661,616.

(51) Int. Cl.
| | | |
|---|---|---|
| *H04W 24/10* | (2009.01) | |
| *H04W 28/06* | (2009.01) | |
| *H04B 7/06* | (2006.01) | |
| *H04J 13/00* | (2011.01) | |
| *H04W 72/12* | (2009.01) | |
| *H04W 72/00* | (2009.01) | |

(52) U.S. Cl.
CPC .......... *H04L 1/0025* (2013.01); *H04L 1/0026* (2013.01); *H04L 1/0029* (2013.01); *H04W 24/10* (2013.01); *H04W 28/06* (2013.01); *H04W 72/00* (2013.01); *H04W 72/1231* (2013.01)

(56) References Cited

U.S. PATENT DOCUMENTS

| | | | |
|---|---|---|---|
| 9,661,616 B2* | 5/2017 | Golitschek Edler von Elbwart | ............... H04W 24/10 |
| 10,117,230 B2* | 10/2018 | Golitschek Edler von Elbwart | ............... H04W 24/10 |
| 2004/0151146 A1 | 8/2004 | Hammerschmidt | |
| 2008/0062920 A1 | 3/2008 | Pi et al. | |
| 2008/0080449 A1 | 4/2008 | Huang et al. | |
| 2009/0016463 A1 | 1/2009 | Roh | |
| 2009/0129284 A1 | 5/2009 | Jung et al. | |
| 2011/0149792 A1 | 6/2011 | Nakano et al. | |
| 2011/0249578 A1* | 10/2011 | Nayeb Nazar | .... H04W 74/0841 370/252 |
| 2011/0249643 A1* | 10/2011 | Barbieri | ............... H04L 1/0026 370/329 |
| 2011/0280287 A1 | 11/2011 | Cheng et al. | |
| 2012/0014424 A1 | 1/2012 | Heath, Jr. et al. | |
| 2012/0134275 A1 | 5/2012 | Choi et al. | |
| 2012/0236736 A1 | 9/2012 | Frank et al. | |
| 2013/0003788 A1 | 1/2013 | Marinier et al. | |
| 2013/0044624 A1 | 2/2013 | Su et al. | |
| 2013/0107849 A1 | 5/2013 | Park | |
| 2013/0229958 A1* | 9/2013 | Sagae | ............... H04W 72/0406 370/281 |
| 2013/0250927 A1 | 9/2013 | Song et al. | |
| 2016/0197657 A1* | 7/2016 | Ko | ............... H04L 1/0026 370/329 |

FOREIGN PATENT DOCUMENTS

| | | |
|---|---|---|
| WO | 2007/046734 A1 | 4/2007 |
| WO | 2009/028819 A2 | 3/2009 |

OTHER PUBLICATIONS

3GPP TS 36.211 V8.9.0, 3$^{rd}$ Generation Partnership Project; Technical Specification Group Radio Access Network; Evolved Universal Terrestrial Radio Access (E-UTRA); Physical Channels and Modulation (Release 8), Dec. 2009, 83 pages.

3GPP TS 36.211 V10.0.0, 3$^{rd}$ Generation Partnership Project; Technical Specification Group Radio Access Network; Evolved Universal Terrestrial Radio Access (E-UTRA); Physical Channels and Modulation (Release 10), Dec. 2010, 65 pages.

3GPP TS 36.212 V10.0.0, "3$^{rd}$ Generation Partnership Project; Technical Specification Group Radio Access Network; Evolved Universal Terrestrial Radio Access (E-UTRA); Multiplexing and channel coding (Release 10)," Dec. 2010, 72 pages.

3GPP TS 36.213 V10.0.1, 3$^{rd}$ Generation Partnership Project; Technical Specification Group Radio Access Network; Evolved Universal Terrestrial Radio Access (E-UTRA); Physical layer procedures (Release 10), Dec. 2010, 98 pages.

3GPP TS 36.300 V10.2.0, "3$^{rd}$ Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 10)," Dec. 2010, 200 pages.

ETSI TS 136.212 V10.2.0, "LTE; Evolved Universal Terrestrial Radio Access (E-UTRA); Multiplexing and channel coding (3GPP TS 36.212 V10.2.0 Release 10)," Jun. 2011, 80 pages.

ETSI TS 136.213 V10.2.0, "LTE; Evolved Universal Terrestrial Radio Access (E-UTRA); Physical layer procedures (3GPP TS 36.213 V10.2.0 Release 10)," Jun. 2011, 122 pages.

European Search Report dated Dec. 14, 2011, for corresponding EP Application No. 11 00 6651, 4 pages.

International Search Report dated Jul. 1, 2013, for corresponding International Application No. PCT/EP2012/065723, 5 pages.

Notice of Reasons for Rejections dated Jul. 12, 2016, for corresponding JP Application No. 2014-524407, 9 pages.

* cited by examiner

CHANNEL QUALITY INFORMATION REPORTING FOR SUBFRAMES

BACKGROUND

Technical Field

The present invention relates to reporting of the channel quality information suitable for heterogeneous networks. In particular, the present invention relates to a method and apparatus for reporting on the channel quality information.

Description of the Related Art

Third generation (3G) mobile systems, such as, for instance, universal mobile telecommunication systems (UMTS) standardized within the third generation partnership project (3GPP) have been based on wideband code division multiple access (WCDMA) radio access technology. Today, 3G systems are being deployed on a broad scale all around the world. After enhancing this technology by introducing high-speed downlink packet access (HSDPA) and an enhanced uplink, also referred to as high-speed uplink packet access (HSUPA), the next major step in evolution of the UMTS standard has brought the combination of orthogonal frequency division multiplexing (OFDM) for the downlink and single carrier frequency division multiplexing access (SC-FDMA) for the uplink. This system has been named long term evolution (LTE) since it has been intended to cope with future technology evolutions.

The LTE system represents efficient packet based radio access and radio access networks that provide full IP-based functionalities with low latency and low cost. The Downlink will support data modulation schemes QPSK, 16QAM, and 64QAM and the Uplink will support BPSK, QPSK, 8PSK and 16QAM.

LTE's network access is to be extremely flexible, using a number of defined channel bandwidths between 1.25 and 20 MHz, contrasted with UMTS terrestrial radio access (UTRA) fixed 5 MHz channels. Spectral efficiency is increased by up to four-fold compared with UTRA, and improvements in architecture and signalling reduce round-trip latency. Multiple Input/Multiple Output (MIMO) antenna technology should enable 10 times as many users per cell as 3GPP's original WCDMA radio access technology. To suit as many frequency band allocation arrangements as possible, both paired (frequency division duplex FDD) and unpaired (time division duplex TDD) band operation is supported. LTE can co-exist with earlier 3GPP radio technologies, even in adjacent channels, and calls can be handed over to and from all 3GPP's previous radio access technologies.

The overall architecture is shown in FIG. 1 and a more detailed representation of the E-UTRAN architecture is given in FIG. 2. The E-UrTRAN consists of an eNodeB, providing the E-UTRA user plane (PDCP/RLC/MAC/PHY) and control plane (RRC) protocol terminations towards the user equipment (UE). The eNodeB (eNB) hosts the Physical (PHY), Medium Access Control (MAC), Radio Link Control (RLC) and Packet Data Control Protocol (PDCP) layers that include the functionality of user-plane header-compression and encryption. It also offers Radio Resource Control (RRC) functionality corresponding to the control plane. It performs many functions including radio resource management, admission control, scheduling, enforcement of negotiated uplink Quality of Service (QoS), cell information broadcast, ciphering/deciphering of user and control plane data, and compression/decompression of downlink/uplink user plane packet headers. The eNodeBs are interconnected with each other by means of the X2 interface.

The eNodeBs are also connected by means of the S1 interface to the EPC (Evolved Packet Core), more specifically to the MME (Mobility Management Entity) by means of the S1-MME and to the Serving Gateway (SGW) by means of the S1-U. The S1 interface supports a many-to-many relation between MMEs/Serving Gateways and eNodeBs.

FIG. 3 illustrates structure of a component carrier in LTE Release 8. The downlink component carrier of the 3GPP LTE Release 8 is sub-divided in the time-frequency domain in so-called sub-frames each of which is divided into two downlink slots 320 corresponding to a time period $T_{slot}$. The first downlink slot comprises a control channel region within the first OFDM symbol(s). Each sub-frame consists of a given number of OFDM symbols in the time domain, each OFDM symbol spanning over the entire bandwidth of the component carrier. The smallest unit of resources that can be assigned by a scheduler is a resource block 130 also called physical resource block (PRB). A PRB 330 is defined as $N_{symb}^{DL}$ consecutive OFDM symbols in the time domain and $N_{sc}^{RB}$ consecutive sub-carriers in the frequency domain. In practice, the downlink resources are assigned in resource block pairs. A resource block pair consists of two resource blocks. It spans $N_{sc}^{RB}$ consecutive sub-carriers in the frequency domain and the entire 2. $N_{symb}^{DL}$ modulation symbols of the sub-frame in the time domain. NDb may be either 6 or 7 resulting in either 12 or 14 OFDM symbols in total. Consequently, a physical resource block 330 consists of $N_{symb}^{DL} \times N_{sc}^{RB}$ resource elements 140 corresponding to one slot in the time domain and 180 kHz in the frequency domain (further details on the downlink resource grid can be found, for example, in 3GPP TS 36.211. *"Evolved universal terrestrial radio access (E-UTRA); physical channels and modulations (Release 8)"*, version 8.9.0, December 2009, Section 6.2, available at http://www.3gpp.org., which is incorporated herein by reference).

The number of physical resource blocks $N_{RB}^{DL}$ in downlink depends on the downlink transmission bandwidth configured in the cell and is at present defined in LTE as being from the interval of 6 to 110 PRBs.

The frequency spectrum for IMT-advanced was decided at the World Radio Communication Conference (WRC-07) in November 2008. However, the actual available frequency bandwidth may differ for each region or country. The enhancement of LTE standardized by 3GPP is called LTE-advanced (LTE-A) and has been approved as the subject matter of Release 10. LTE-A Release 10 employs carrier aggregation according to which two or more component carriers as defined for LTE Release 8 are aggregated in order to support wider transmission bandwidth, for instance, transmission bandwidth up to 100 MHz. More details on carrier aggregation can be found in 3GPP TS 36.300 *"Evolved Universal terrestrial Radio Access (E-UTRA) and Universal terrestrial Radio Access Network (E-UTRAN); Overall description"*, v10.2.0, December 2010, Section 5.5 (Physical layer), Section 6.4 (Layer 2) and Section 7.5 (RRC), freely available at http://www.3gpp.org/ and incorporated herein by reference. It is commonly assumed that the single component carrier does not exceed a bandwidth of 20 MHz. A terminal may simultaneously receive and/or transmit on one or multiple component carriers depending on its capabilities. A UE may be configured to aggregate a different number of component carriers (CC) in the uplink and in the downlink. The number of downlink CCs which can be configured depends on the downlink aggregation capability of the UE. The number of uplink CCs which can be configured depends on the uplink aggregation capability of the UE. However, it is not possible to configure a UE with more uplink CCs than downlink CCs.

The term "component carrier" refers to a combination of several resource blocks. In future releases of LTE, the term "component carrier" is no longer used: instead, the terminology is changed to "cell", which refers to a combination of downlink and optionally uplink resources. The linking between the carrier frequency of the downlink resources and the carrier frequency of the uplink resources is indicated in the system information transmitted on the downlink resources. There is a PCell (Primary Cell) and none or several (e.g., up to four) SCells (Secondary Cells). It may be noted that the different cells do not have to be tied to the same logical network element (such as an eNodeB) or physical transmission point (e.g., an antenna site); it can also be envisaged that different cells seen by a terminal are transmitted from different network elements and/or transmission points. A first example is that PCell and SCell are both tied to the same eNodeB, but are transmitted from two different transmission points, e.g., PCell from the location of the eNodeB and SCell from a remote radio-head connected to the eNodeB. Another example is that PCell is tied to and transmitted from a first eNodeB, while SCell is tied to and transmitted from a second eNodeB. It should also be noted that PCell and SCell, as well as component carriers, could be completely, partly, or non-overlapping with respect to their time and frequency transmission resources. The terms Cell and component carrier are used in the following interchangeably, since both SCells and PCells may be seen as a component carrier. This however should not be interpreted to restrict the scope of the invention to a particular Release of the LTE standard.

When carrier aggregation is configured, the UE only has one RRC connection with the network. At RRC connection establishment/re-establishment/handover, one serving cell provides the NAS mobility information (e.g., TAI), and at RRC connection re-establishment/handover, one serving cell provides the security input. This cell is referred to as the Primary Cell (PCell). In the downlink, the carrier corresponding to the PCell is the Downlink Primary Component Carrier (DL PCC) while in the uplink it is the Uplink Primary Component Carrier (UL PCC).

Depending on UE capabilities. Secondary Cells (SCells) can be configured to form together with the PCell a set of serving cells. In the downlink, the carrier corresponding to an SCell is a Downlink Secondary Component Carrier (DL SCC) while in the uplink it is an Uplink Secondary Component Carrier (UL SCC).

The configured set of serving cells for a UE therefore always consists of one PCell and zero or more SCells:
For each SCell the usage of uplink resources by the UE in addition to the downlink ones is configurable (the number of DL SCCs configured is therefore always larger or equal to the number of UL SCCs and no SCell can be configured for usage of uplink resources only);
From a UE viewpoint, each uplink resource only belongs to one serving cell:
The number of serving cells that can be configured depends on the aggregation capability of the UE;
PCell can only be changed with handover procedure (i.e., with security key change and RACH procedure);
PCell is used for transmission of PUCCH;
Unlike SCells, PCell cannot be de-activated;
NAS information is taken from PCell.

The reconfiguration, addition and removal of SCells can be performed by RRC. At intra-LTE handover. RRC can also add, remove, or reconfigure SCells for usage with the target PCell. When adding a new SCell, dedicated RRC signalling is used for sending all required system information of the SCell, i.e., while in connected mode. UEs need not acquire broadcasted system information from the SCells.

The principle of link adaptation is fundamental to the design of a radio interface which is efficient for packet-switched data traffic. Unlike the early versions of UMTS (Universal Mobile Telecommunication System), which used fast closed-loop power control to support circuit-switched services with a roughly constant data rate, link adaptation in LTE adjusts the transmitted data rate (modulation scheme and channel coding rate) dynamically to match the prevailing radio channel capacity for each user.

For the downlink data transmissions in LTE, the eNodeB typically selects the modulation scheme and code rate (MCS) depending on a prediction of the downlink channel conditions. An important input to this selection process is the Channel State Information (CSI) feedback transmitted by the User Equipment (UE) in the uplink to the eNodeB.

Channel state information is used in a multi-user communication system, such as for example 3GPP LTE to determine the quality of channel resource(s) for one or more users. In general, in response to the CSI feedback the eNodeB can select between QPSK, 16-QAM and 64-QAM schemes and a wide range of code rates. This CSI information may be used to aid in a multi-user scheduling algorithm to assign channel resources to different users, or to adapt link parameters such as modulation scheme, coding rate or transmit power, so as to exploit the assigned channel resources to its fullest potential.

The CSI is reported for every component carrier, and, depending on the reporting mode and bandwidth, for different sets of subbands of the component carrier. A channel resource may be defined as a "resource block" as exemplary illustrated in FIG. 3 where a multi-carrier communication system. e.g., employing OFDM as for example discussed in the LTE work item of 3GPP, is assumed. More generally, it may be assumed that a resource block designates the smallest resource unit on an air interface of a mobile communication that can be assigned by a scheduler. The dimensions of a resource block may be any combination of time (e.g., time slot, sub-frame, frame, etc., for time division multiplex (TDM)), frequency (e.g., subband, carrier frequency, etc., for frequency division multiplex (FDM)), code (e.g., spreading code for code division multiplex (CDM)), antenna (e.g., Multiple Input Multiple Output (MIMO)), etc., depending on the access scheme used in the mobile communication system.

Assuming that the smallest assignable resource unit is a resource block, in the ideal case channel quality information for each and all resource blocks and each and all users should be always available. However, due to constrained capacity of the feedback channel this is most likely not feasible or even impossible. Therefore, reduction or compression techniques are required so as to reduce the channel quality feedback signalling overhead. e.g., by transmitting channel quality information only for a subset of resource blocks for a given user.

In 3GPP LTE, the smallest unit for which channel quality is reported is called a subband, which consists of multiple frequency-adjacent resource blocks.

As described before, user equipments will usually not perform and report CSI measurements on configured but deactivated downlink component carriers but only radio resource management related measurements like RSRP (Reference Signal Received Power) and RSRQ (Reference Signal Received Quality). When activating a downlink component carrier, it is important that the eNodeB acquires quickly CSI information for the newly activated component carrier(s) in order to be able to select an appropriate MCS for efficient downlink scheduling. Without CSI information the eNodeB does not have knowledge about the user equipment's downlink channel state and would most likely select a too aggressive or too conservative MCS for downlink data transmission, both of which would in turn lead to resource utilization inefficiency due to required retransmissions or unexploited channel capacity.

Commonly, mobile communication systems define special control signalling that is used to convey the channel quality feedback. In 3GPP LTE, there exist three basic elements which may or may not be given as feedback for the channel quality. These channel quality elements are:

MCSI: Modulation and Coding Scheme Indicator, sometimes referred to as Channel Quality Indicator (CQI) in the LTE specification and in this document PMI: Precoding Matrix Indicator RI: Rank Indicator The MCSI suggests a modulation and coding scheme that should be used for transmission, while the PMI points to a pre-coding matrix/vector that is to be employed for spatial multiplexing and multi-antenna transmission (MIMO) using a transmission matrix rank that is given by the RI. Details about the involved reporting and transmission mechanisms are given in the following specifications to which it is referred for further reading (all these documents are available at http://www.3gpp.org and incorporated herein by reference):

3GPP TS 36.211. "Evolved Universal Terrestrial Radio Access (E-UTRA); Physical channels and modulation", version 10.0.0, particularly Sections 6.3.3 and 6.3.4;

3GPP TS 36.212, "Evolved Universal Terrestrial Radio Access (E-UTRA); Multiplexing and channel coding", version 10.0.0, particularly Sections 5.2.2 and 5.2.4 and 5.3.3; and 3GPP TS 36.213. "Evolved Universal Terrestrial Radio Access (E-UTRA); Physical layer procedures", version 10.0.1, particularly sections 7.1.7, and 7.2.

In 3GPP LTE, not all of the above identified three channel quality elements are reported at any time. The elements being actually reported depend mainly on the configured reporting mode. It should be noted that 3GPP LTE also supports the transmission of two codewords (i.e., two codewords of user data (transport blocks) may be multiplexed to and transmitted in a single sub-frame), so that feedback may be given either for one or two codewords. Some details are provided in the next sections and in Table 1 below for an exemplary scenario using a 20 MHz system bandwidth. This information is based on 3GPP TS 36.213, Section 7.2.1 mentioned above. Codewords and their mapping on layers is described in detail for instance in 3GPP TS 36.211. Section 6.3.3.2.

The individual reporting modes for the aperiodic channel quality feedback are defined in 3GPP LTE as follows:

Reporting Mode 1-2

Contents of this report for transmission modes 1-8:
    One set S MCSI value per codeword
    One preferred PMI for each subband is selected
    In case of transmission modes 4 or 8: One RI value Contents of this report for transmission mode 9:
    One set S MCSI value per codeword
    One first preferred PMI for set S
    One preferred PMI for each subband
    One RI value Reporting Mode 2-0

Contents of this report:
    One set S MCSI value
    Positions of M selected subbands
    One MCSI value for M selected subbands (2 bits differential set S MCSI value, non-negative)
    In case of transmission mode 3: One RI value Reporting Mode 2-2

Contents of this report for transmission modes 1-8:
    One set S MCSI value per codeword
    One preferred PMI for set S
    Positions of M selected subbands
    One MCSI value for M selected subbands per codeword (2 bits differential to set S MCSI value, non-negative)
    One preferred PMI for M selected subbands
    In case of transmission modes 4 or 8: One RI value Contents of this report for transmission mode 9:
    One set S MCSI value per codeword
    One first preferred PMI for set S
    One second preferred PMI for set S
    Positions of M selected subbands
    One MCSI value for M selected subbands per codeword (2 bits differential to wideband MCSI value, non-negative)
    One first preferred PMI for M selected subbands
    One second preferred PMI for M selected subbands
    In case of transmission modes other than transmission mode 4: One RI value Reporting Mode 3-0

Contents of this report:
    One set S MCSI value
    One MCSI value per subband (2 bits differential to set S MCSI value)
    In case of transmission mode 3: One RI value Reporting Mode 3-1

Contents of this report for transmission modes 1-8:
    One set S MCSI value per codeword
    One preferred PMI for set S
    One MCSI value per codeword per subband (2 bits differential to set S MCSI value)
    In case of transmission modes 4 or 8: One RI value Contents of this report for transmission mode 9:
    One set S MCSI value per codeword
    One first preferred PMI for set S
    One second preferred PMI for set S
    One MCSI value per codeword per subband (2 bits differential to set S MCSI value)
    One RI value The below Table 1 discloses the amount of bits used for CSI reporting for the different Transmission Modes and Reporting Modes combinations. Whether or not the RI value is transmitted as well, is not considered in the following Table 1. i.e., the bits only cover the CSI reporting as such, MCSI (CQI) and PMI. It should be noted that for some modes detailed numbers are not yet agreed in the standard, and may thus be changed during further standardization.

As mentioned above, for this table it is assumed that the component carrier has a 20 MHz bandwidth.

TABLE 1

| Transmission Mode # | Antenna port & rank indicator conditions | Reporting Mode 1-2 | 2-0 | 3-0 | 2-2 | 3-1 |
|---|---|---|---|---|---|---|
| 1 (Single-antenna port 0) | NA | NA | 24 | 30 | NA | NA |
| 7 (if the number of PBCH antenna ports is one, single-antenna port, port; otherwise transmit diversity) | | | | | | |
| 2 (Transmit diversity) | 2TX or 4TX antenna ports | NA | 24 | 30 | NA | NA |
| 3 (Transmit Diversity if the associated rank indicator is 1, otherwise large delay CDD) | 2TX antenna ports | NA | 24 | 30 | NA | NA |
| | 4TX antenna ports | | 24 | 30 | | |
| 4 (Closed-loop spatial multiplexing) | 2TX antenna ports RI = 1 | 30 | NA | NA | 28 | 32 |
| | 2TX antenna ports RI > 1 | 21 | | | 32 | 61 |
| | 4TX antenna ports RI = 1 | 56 | | | 32 | 34 |
| | 4TX antenna ports RI > 1 | 60 | | | 38 | 64 |
| 5 (Multi-user MIMO) | 2TX antenna ports | NA | NA | NA | NA | 32 |
| | 4TX antenna ports | | | | | 34 |
| 6 (Closed-loop spatial multiplexing with single transmission layer) | 2TX antenna ports | 30 | NA | NA | 28 | 32 |
| | 4TX antenna ports | 56 | | | 32 | 34 |
| 8 | 2TX antenna ports RI = 1 | 30 | 24 | 30 | 28 | 32 |
| | 2TX antenna ports RI > 1 | 21 | | | 32 | 61 |
| | 4TX antenna ports RI = 1 | 56 | | | 32 | 34 |
| | 4TX antenna ports RI > 1 | 60 | | | 38 | 64 |
| 9 | 2TX antenna ports RI = 1 | 34 | NA | NA | 36 | 36 |
| | 2TX antenna ports RI > 1 | 25 | | | 40 | 65 |
| | 4TX antenna ports RI = 1 | 61 | | | 40 | 38 |
| | 4TX antenna ports RI > 1 | 64 | | | 46 | 68 |

For instance, in transmission mode 1 and reporting mode 3-0, the CQI reporting includes 30 bits of information. In the assumed 20 Mhz component carrier scenario, for mode 3-0 there would be 13 subbands in total (100 resource blocks in total, with 8 resource blocks per subband). For each subband a differential MCSI with 2 bits is reported back. In addition, there is a wideband MCSI with 4 bits (assuming aperiodic reporting of the CSI). Therefore, the CSI feedback is composed of 30 bits.

It should be noted that the term "subband" is here used so as to represent a number of resource blocks as outlined earlier, while the term set S represents generally a subset of the whole set of resource blocks in the system bandwidth. In the context of 3GPP LTE and LTE-A, the set S so far is defined to always represent the whole cell. i.e., component carrier bandwidth, a frequency range of up to 20 MHz. and is for simplicity hereafter referred to as "wideband". However, in the future the set S may as well only refer some of the resource blocks of the cell, in which case the skilled person shall pay attention to interpret the term wideband (or set S) used in connection with the embodiments of the invention broader than only "wideband" (or "set S") as such.

The periodicity and frequency resolution to be used by a UE to report on the CSI are both controlled by the eNodeB. The Physical Uplink Control Channel (PUCCH) is used for periodic CSI reporting only; the PUSCH is used for aperiodic reporting of the CSI, whereby the eNodeB specifically instructs the UE to send an individual CSI report embedded into a resource which is scheduled for uplink data transmission.

In addition, in case of multiple transmit antennas at the eNodeB. CSI values(s) may be reported for a second codeword. For some downlink transmission modes, additional feedback signaling consisting of Precoding Matrix Indicators (PMI) and Rank Indications (RI) is also transmitted by the UE.

In order to acquire CSI information quickly, eNodeB can schedule aperiodic CSI by setting a CSI request bit in an uplink resource grant sent on the Physical Downlink Control Channel.

In 3GPP LTE, a simple mechanism is foreseen to trigger the so-called aperiodic channel quality feedback from the user equipment. An eNodeB in the radio access network sends a L1/L2 control signal to the user equipment to request the transmission of the so-called aperiodic CSI report (see 3GPP TS 36.212, Section 5.3.3.1.1 and 3GPP TS 36.213, Section 7.2.1 for details). Another possibility to trigger the provision of aperiodic channel quality feedback by the user equipments is linked to the random access procedure (see 3GPP TS 36.213, Section 6.2).

Whenever a trigger for providing channel quality feedback is received by the user equipment, the user equipment subsequently transmits the channel quality feedback to the eNodeB. Commonly, the channel quality feedback (i.e., the CSI report) is multiplexed with uplink (user) data on the Physical Uplink Shared CHannel (PUSCH) resources that have been assigned to the user equipment by L1/L2 signalling by the scheduler (eNodeB). In case of carrier aggregation, the CSI report is multiplexed on those PUSCH resources that have been granted by the L1/L2 signal (i.e., the PDCCH) which triggered the channel quality feedback.

The content of the channel state information fields comprises different feedback elements to indicate the channel quality for a particular component carrier as already described above. According to current standardization, it may comprise one or more of the following: a modulation and coding scheme index (MCSI) value for the complete component carrier (i.e., all subbands, set S), an MCSI offset value for each subband of the component carrier (the MCSI offset value is encoded as a differential to the MCSI value of the set S of subbands), an MCSI offset value for a set M of subbands of the component carrier (set M encompasses less subbands than set S; the MCSI offset value may again be encoded as a differential to the MCSI value of the complete component carrier) and a precoding matrix indicator. A rank indicator (RI) is also transmitted for the channel state information reporting, however not within the channel state information message as such but separately, because the size of the channel status information report (MCSI & PMI) depends on the reported RI.

Which of these feedback elements is actually included into the channel state report depends amongst other things on the transmission and reporting modes configured by the base station. In each case and independent from the feedback elements included, the values of the elements in the channel state information field for the specific component carrier should be defined in a way that allows the base station to determine whether the content of said field is a genuine channel quality indication or whether it is an indication as to the status of the associated component carrier for which no channel state information was calculated.

Modulation and Coding Scheme Index (MCSI)

Adaptive modulation and coding (AMC) can be used to match the information data rate for each user to the variations in the received signal quality. The degrees of freedom for the AMC consists of the modulation and coding schemes, and the particular combination of a modulation scheme and a coding rate is indicated using the Modulation and Coding Scheme Index (MCSI). An exemplary list of modulation schemes and code rates that can be signaled by means of an MSCI is shown in Table 2 below. It should be noted that the particular entries are usually dependent on the target communication system: Table 2 shows the definition for the 3GPP LTE Release 8 system. Other systems may, e.g., provide more than 16 levels or use additional or different modulation schemes.

TABLE 2

| MCSI (CQI) index | Modulation Scheme | Code Rate * 1024 | Spectral Efficiency |
|---|---|---|---|
| 0 | Out of Range (OoR) | | |
| 1 | QPSK | 78 | 0.1523 |
| 2 | QPSK | 120 | 0.2344 |
| 3 | QPSK | 193 | 0.3770 |
| 4 | QPSK | 308 | 0.6016 |
| 5 | QPSK | 449 | 0.8770 |
| 6 | QPSK | 602 | 1.1758 |
| 7 | 16QAM | 378 | 1.4766 |
| 8 | 16QAM | 490 | 1.9141 |
| 9 | 16QAM | 616 | 2.4063 |
| 10 | 64QAM | 466 | 2.7305 |
| 11 | 64QAM | 567 | 3.3223 |
| 12 | 64QAM | 666 | 3.9023 |
| 13 | 64QAM | 772 | 4.5234 |
| 14 | 64QAM | 873 | 5.1152 |
| 15 | 64QAM | 948 | 5.5547 |

There are several Reporting Modes and Transmission Modes that have an impact on the content of the Channel State Information reporting, and in particular on the parameters that are included to report on the channel quality of a component carrier.

In the Reporting Modes 3-0 and 3-1, one MCSI value is encoded for each subband per codeword. This is called subband differential report. MCSI value for each subbands for each codeword is encoded differentially using 2-bits relative to its respective wideband MCSI, according to the following:

Subband differential MCSI offset level=subband MCSI index−wideband MCSI index

Therefore, the MCSI index for each subband can be calculated by adding the wideband MCSI index and the offset level, coded by the Differential MCSI value.

The mapping of the differential MCSI value and the actual offset level that is to be applied to the wideband MCSI index is determined by the following Table 3 for reporting modes 3-0 and 3-1.

TABLE 3

| Subband differential MCSI value ($MCSI_{offset\_subband}$) | Offset level |
|---|---|
| 0 | 0 |
| 1 | 1 |
| 2 | ≥2 |
| 3 | ≤−1 |

Subband size in this mode is 4, 6, or 8RBS. For instance, if the wideband MCSI encodes MCSI index 8 (16QAM and 490/1024 code rate) and the 2-bit differential MCSI value for subband #1 is 1, then the effective MCSI index for said subband #1 is 9 (64QAM, 466/1024 code rate). When the differential MCSI value for subband #1 is 2, the resulting MCSI index for said subband #1 is at least 2 indexes higher than the wideband MCSI, i.e., 210.

In the reporting modes 2-0 and 2-2 one MCSI value for the M selected subbands is reported per codeword by the user equipment. Subband size in this mode is 2, 3 or 4 RBS. The MCSI value for the M selected subbands for each codeword is encoded differentially using 2-bits relative to its respective wideband MCSI value according to the following:

Differential MCSI Offset Level=MCSI Index for M Selected Subband−Wideband MCSI Index Therefore, the base station can calculate the MSCI index for the selected M subbands by adding the wideband MCSI index and the differential MSCI offset level, as encoded by the subband differential MCSI value according to the following Table 4 for reporting modes 2-0 and 2-2.

TABLE 4

| Differential MCSI value ($MCSI_{offset\_setM}$) | Offset level |
|---|---|
| 0 | ≤1 |
| 1 | 2 |
| 2 | 3 |
| 3 | ≥4 |

Moreover, a spatial differential report is used in case of periodic reports for wideband and multiple codewords. The differential value ranges is −4 to +3 according to Codeword1 MCSI offset level=wideband MCSI index for codeword 0−wideband MCSI index for codeword 1 and is shown in Table 4a.

TABLE 4a

| Differential MCSI value ($MCSI_{offset\_codeword1}$) | Offset level |
|---|---|
| 0 | 0 |
| 1 | 1 |
| 2 | 2 |
| 3 | ≥3 |
| 4 | ≤−4 |
| 5 | −3 |
| 6 | −2 |
| 7 | −1 |

Precoding Matrix Indicator (PMI)

For some transmission modes, precoding feedback is used for channel dependent codebook based precoding and relies on the UEs reporting the precoding matrix indicator. Each PMI value corresponds to a codebook index according to the corresponding Tables in Chapter 6.3.4.2.3 "Codebook for precoding" of 3GPP document TS 36.211 v10.0.0. The precoder, whose index constitutes the PMI, is the precoder that maximizes the aggregate number of data bits which could be received across all layers. As apparent from the above-mentioned tables, the PMI may be 2 or 3 bits long depending on the antenna ports used for transmission and the associated rank indicator.

Rank Indicator (RI)

The UE can also be configured to report the channel rank via a rank indicator, which is calculated to maximize the capacity over the entire bandwidth.

In particular, for spatial multiplexing, the UE shall determine a RI corresponding to the number of useful transmission layers. For transmit diversity, RI is equal to one.

In practice, the rank indicator has influence on whether the channel state information is reported for one or two codewords. For instance, the channel state information of only one codeword is reported when RI is 1, and the channel state information of two codewords is reported when RI is >1.

In the LTE system, the actual transmission rate depends on several deployment factors such as the distance between mobile terminal and base station. Thus, a denser infrastructure is required in order to support very high data rates. However, densifying the existing macro cell network tends to be rather expensive. A more attractive approach is complementing the macro cell, which provides basic coverage with additional low output power pico cells where necessary. Deployment of two or more at least partly overlaying cell layers is called heterogeneous deployment. Already in release 8 of LTE, an inter-cell interference coordination (ICIC) mechanism has been introduced in order to dynamically coordinate the resource usage among the cell layers and to avoid overlapping of the resources in different layers. The cell layers can exchange information about which frequencies they intend to schedule transmissions on in the near future which enables reduction or even complete avoidance of the additional interference. To separate control signaling for different cell layers, frequency domain schemes employ carrier aggregation. At least one component carrier in each cell layer is protected from interference from other cell layers by not transmitting control signaling on the respective component carrier. The time domain schemes employs separation of control signaling on the different cell layers in the time domain. In particular, some subframes in the low power cell layer are protected from interference. In particular, in non-protected subframes, macro cell and pico-cell eNodeB (eNB) transmit at their nominal transmit power. As a consequence, the signal from the macro eNB is seen as the dominant interference source in the pico-cell. In contrast, in protected subframes, the macro eNB is transmitting almost no power. As a consequence, the interference in the pico-cell is greatly reduced. Consequently, the SINR in the pico-cell center is much higher in comparison with the non protected subframes. This results in increase coverage area. It should be noted that the protected subframes are particularly useful in the described pico-/macro-cell situation, but can be used as well in any other multi-cell deployment in order to reduce interference to neighboring cell(s).

In the protected subframes, the wideband and subband channel quality indication values for mobile stations in pico-cells can be assumed to be rather high. Due to frequency selectivity of the pico eNodeB (pico UE channel), several subbands are likely to be much better than the wide band average. In such a case, there may be a loss due to the absolute maximum of channel quality information level 15 (cf. Table 2 above), in particular for subband channel quality indication values. This is caused by the fact that the subbands substantially better than level 15 are treated in the same manner as subbands that just reach level 15. Accordingly, the scheduler cannot distinguish between different qualities of level 15 for certain mobile stations and therefore the spectra efficiency is reduced. The scheduler is incapable of knowing how much power de-boosting may be possible for still reaching level 15. The scheduler also cannot know channel capacity differences between multiple mobile stations reporting level 15, and therefore multi-user diversity cannot be optimally exploited.

FIG. 4 illustrates an example of a layered system when non protected subframes are applied and when protected subframes are applied. In particular, the macro eNB 420 as well as pico eNB 410, both transmit at their nominal transmit power, which increases the interference in the pico-cell. The macro eNB 440 transmits at very low power level, while the pico eNB 430 transmits at its nominal transmission power. As a consequence, the interference at the pico-cell is reduced.

BRIEF SUMMARY in view of the above, the aim of the present invention is to provide an efficient approach to channel quality information signaling in a multi-cell environment, which is particularly suitable—though not limited—to a heterogeneous deployment of multiple cell layers.

This is achieved by the features of the independent claims.

Advantageous embodiments of the invention are subject to the dependent claims.

The particular approach of the present invention is to provide different sets of possible channel state information values for determining of the absolutely signaled channel quality reports and relatively signaled channel quality reports.

This allows enhancing the precision of the relatively signaled channel quality reports, which, on the other hand, leads to a more efficient resource utilization and thus, to a higher spectral efficiency.

In accordance with an aspect of the present invention, a method is provided for reporting channel state information from a user equipment to a base station in a communication system, the method comprising the following steps performed by the user equipment: determining a first channel state information value from a first set of predefined channel state values, determining a second channel state information value from a second set of predetermined channel state values, the second set being different from the first set, preparing a channel state information message including at least a relative channel state information calculated based on the first and the second channel state information, and transmitting the channel state information message to the base station.

In accordance with another aspect of the present invention, a user equipment is provided for reporting channel state information to a base station in a communication system, the user equipment comprising: a calculating unit for determining a first channel state information value from a first set of predefined channel state values and for determining a second channel state information value from a second set of predetermined channel state values, the second set being different from the first set, a message generating unit for preparing a channel state information message including at least a relative channel state information calculated based on the first and the second channel state information, and a transmitter for transmitting the channel state information message to the base station.

Preferably, the communication system is a cellular wireless system based on physical resources defined at least in the time and frequency domain. However, the system resources may be defined also by codes or beamforming/different antennas. For instance, the communication system may be a system similar to or based on the 3GPP LTE system Release 8, 9 or 10 and above.

According to an embodiment of the present invention, the first channel state information (CSI) is determined for a predetermined frequency band, the second channel state information is determined for at least one subband of the predetermined frequency band, the relative channel state information is calculated as a difference between the second channel state information value and the first channel state information value, and the second set includes the first set and at least one further predetermined channel state value that represents the best channel state among those contained in the second set. For the present invention it is immaterial whether the difference is obtained by subtracting the first value from the second value or vice versa. Both approaches are applicable. For instance, the first channel state information may be a wide-band CSI and the second channel state information may be a subband CSI. The first set may cover a smaller range of channel state (quality) values than the second set. The first channel state information value may be a value signaled as an absolute value (absolute in the sense that the value is signaled directly and independently of other such channel state values) and the second channel state information value may be a value signaled (reported) relatively to the value of the first channel state information. In particular, by adding the relative value to the first channel state information value, the second channel state information value may be obtained. The second channel state value may be out of the possible range for the first channel state value, in particular in the case in which the relative value is added to upper-range values of the first CSI. This enables higher precision for signalling the second (relative) channel state information values, which may be beneficial especially in the scenarios in which the channel is very good, meaning having high signal to noise and interference ratio and correspondingly offering a low error rate such as block error rate, and correspondingly providing a high spectral efficiency.

According to another embodiment of the present invention, the first channel state information is determined for a first codeword, the second channel state information is determined for a second codeword, and the relative channel state information is calculated as a difference between the first channel state information value and the second channel state information value. The first and the second codeword may be transmitted by different antennas/beams. However, the present invention is not limited thereto and the codewords may also be transmitted with the same antenna(s) with or without further signal processing such as beamforming or precoding.

Advantageously, at least one further predetermined channel state information value is defined by means of a target spectral efficiency, target error rate or a power margin with respect to a predefined channel state value—these parameters reflect the channel quality measured.

Advantageously, the second set includes except the first set further predetermined channel state values, which are indexed and the order of indexing does not match the order of channel quality expressed by the respective indexes. In general, neither the first nor the second set is necessarily ordered according to the channel quality. According to an embodiment of the present invention, the first set is a part of the second set, the second set is indexed, the second set starts with the first set, the first set is ordered according to the channel quality, and the remaining value of the second set other than the first set are not ordered (mapped to the indexes) according to the channel quality.

In accordance with another aspect of the present invention, a method is provided for receiving channel state information reports from a user equipment in a communication system, the method comprising the following steps performed by the base station: receiving a channel state information message from the user equipment; extracting from the received channel state information message at least a relative channel state information, determining a first channel state information value from a first set of predefined channel state values, determining a second channel state information value from a second set of predetermined channel state values, the second set being different from the first set, based on the first channel state information and the relative channel state information.

In accordance with another aspect of the present invention, a base station for receiving channel state information reports from a user equipment in a communication system, the base station comprising: a receiver receiving for a channel state information message from the user equipment; a parsing unit for extracting from the received channel state information message at least a relative channel state information, a calculation unit for determining a first channel state information value from a first set of predefined channel state values, and for determining a second channel state information value from a second set of predetermined channel state values, the second set being different from the first set, based on the first channel state information and the relative channel state information.

The base station may use the received channel state information values for the purposes of scheduling and resource management.

At the base station, in accordance with an embodiment of the present invention, a first-set indicator is determined for indicating which of the predetermined channel state information values from the second set form the first set of predetermined channel state values, and the determined first-set indicator to the user equipment is transmitted.

At the user equipment (user terminal), the following steps are then preferably performed: receiving from the base station a first-set indicator for indicating which of the predetermined channel state information values from the second set form the first set of predetermined channel state values, and determining the channel state information values in the first set in accordance with the first-set indicator.

The predetermined channel state information values in the second set may include modulation and coding scheme indexes as well as an index specifying that the determined modulation and coding scheme is out of range.

Advantageously, the first-set indicator specifies an offset within the indexes of the second set and the channel state information values in the first set are determined as a predefined number of indexes following, or following and including the offset index. Signalling an offset provides a simple means for determining the start of the first set and if the number of possible channel state values in the first state is predefined, the offset is enough for determine the first set. The predefined number of channel state values is preferably a number which is a power of two so that the signalling capacity if used.

In accordance with an embodiment of the present invention, the index specifying that the determined modulation and coding scheme is out of range is located at the first offset index position within the second set and in the first position within the first set. This enables including the out-of-range value always into the first set.

In particular, the modulation and coding scheme index may be an index in a table including a determined or suggested coding scheme, a modulation scheme, and/or a threshold channel quality value and the threshold channel quality value may be given by signal to interference and noise ratio, error rate, or spectral efficiency.

Advantageously and alternatively, the first-set indicator specifies an offset between measured signal to interference and noise ratio and the threshold channel quality values in the table, or an offset for a target error rate.

In accordance with an embodiment of the present invention, a method for reporting channel state information from a user equipment to a base station in a communication system is provided, in which the transmission of data is performed within subframes in time domain, a base station communicating with the user equipment is tied to a first cell, a base station creating interference to the user equipment is tied to a second cell, the subframes in the second cell include protected subframes, in which the base station of the second cell transmits or has advertised to transmit with essentially no power, the method comprising the steps of the method according to the embodiments described above when the channel state information reporting is performed to the base station of the first cell for the protected subframes, and when the channel state information reporting is performed to the base station of the first cell for other than protected subframes, determining a first and a second channel state information values in the first cell, wherein the first set and the second set of the channel state information values are equal and of smaller size than the second set of channel state information values that is used when reporting is performed in protected subframes. In particular, the first cell may be a pico cell and the second cell may be a macro cell. However, this embodiment may be useful for any cells that influence each other by inter-cell interference.

In particular, in case of a system similar to or based on 3GPP LTE, the CSI report preferably contains feedback information with regard to the quality perceived by the user equipment so as to allow the base station to match the information data rate to the measured channel quality. The content of the CSI report also depends on the reporting and transmission modes configured by the eNodeB. An overview of the reporting modes and transmission modes is given in the background section, together with information on the specific content of the CSI report for each case. There are mainly three feedback elements—MCSI, PMI and RI—which are important components for link adaptation. In the following, these parameters will be explained in more detail.

For instance, the channel state information values comprise a Modulation and Coding Scheme Index. MCSI, value common for all subbands and one relative value for each of the subbands, wherein the MCSI value and each relative value are combined to indicate the effective MCSI value for each subband; or the channel state information values comprise an MCSI value common for all subbands and one relative value for a subset M of the plurality of subbands, wherein the MCSI value and the relative value are combined to indicate the effective MCSI value for the subset M of subbands; or the channel state information values comprise an MCSI value for all subbands and at least one precoding matrix indicator, wherein the at least one precoding matrix indicator of the predetermined channel state information values is set to a predetermined value, and the MCSI value of the predetermined channel state information values is set to 0.

In accordance with another aspect of the present invention, a computer program product comprising a non-transitory computer-readable medium having a computer-readable program code embodied thereon is provided, the program code being adapted to carry out the present invention.

BRIEF DESCRIPTION OF THE SEVERAL VIEWS OF THE DRAWINGS

The above and other objects and features of the present invention will become more apparent from the following description and preferred embodiments given in conjunction with the accompanying drawings in which.

DETAILED DESCRIPTION

Figure 1:
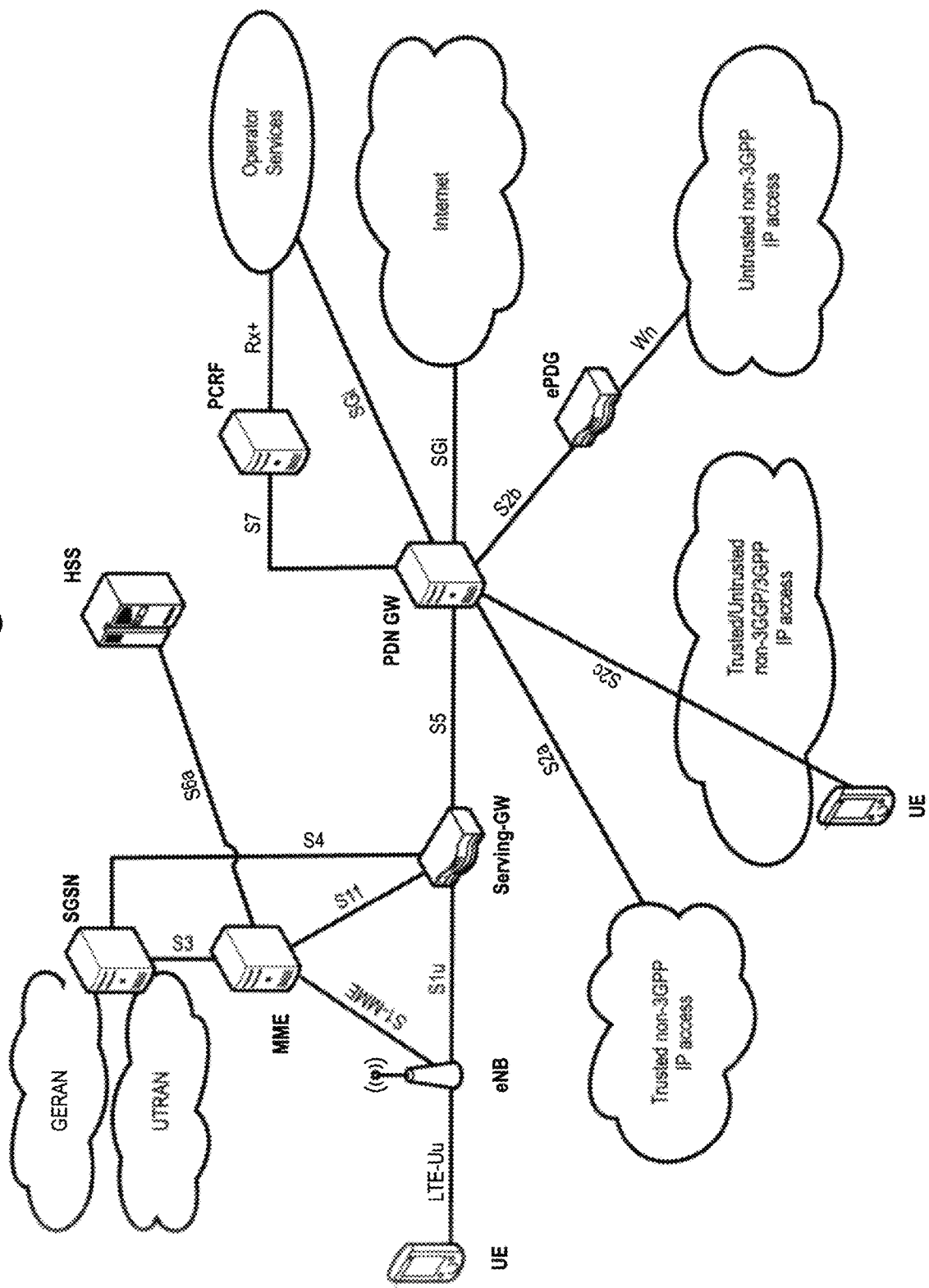
FIG. 1 is a schematic drawing showing an exemplary architecture of a 3GPP LTE system.
Figure 2:
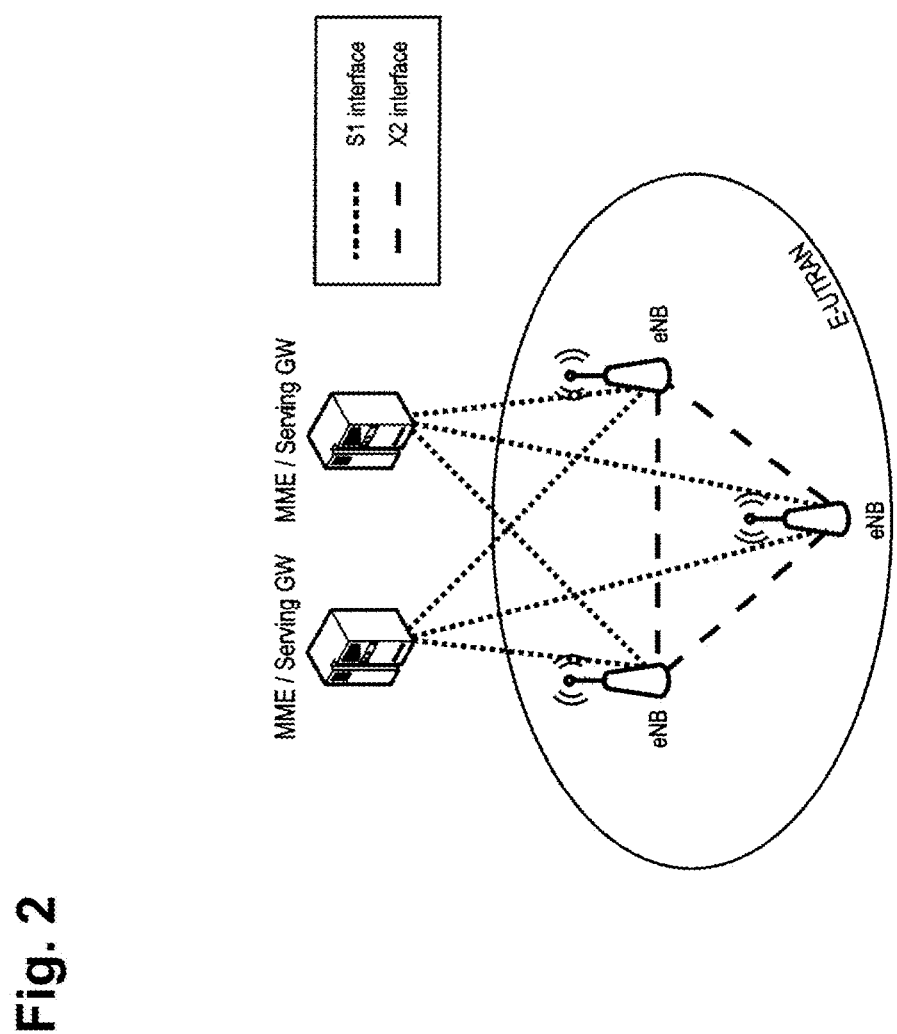
FIG. 2 is a schematic drawing showing an exemplary overview of the overall E-UTRAN architecture of 3GPP LTE.
Figure 3:
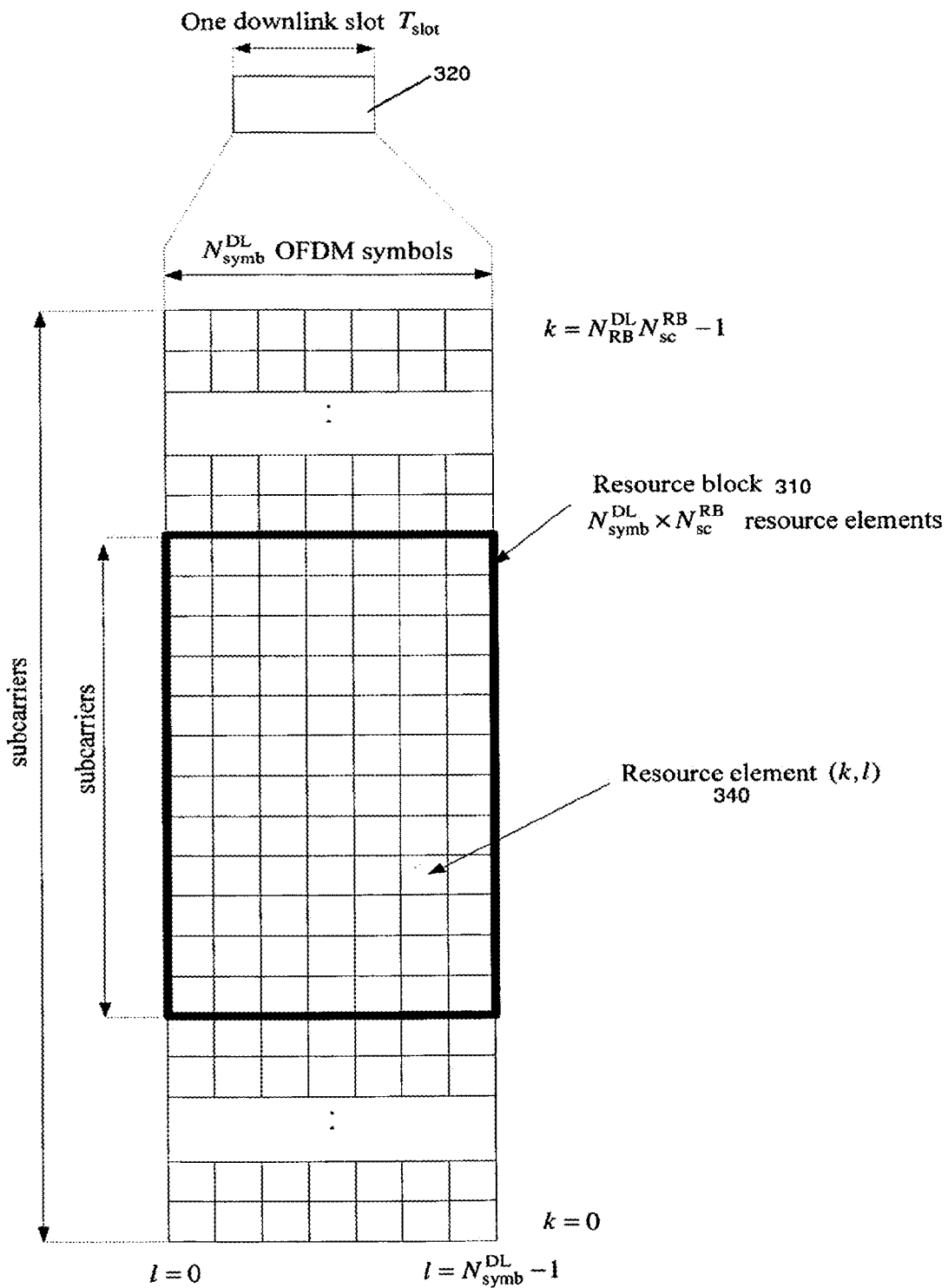
FIG. 3 is a schematic drawing showing an exemplary sub-frame structure on a downlink component carrier as defined for 3GPP LTE (Release 8/9)
Figure 4:
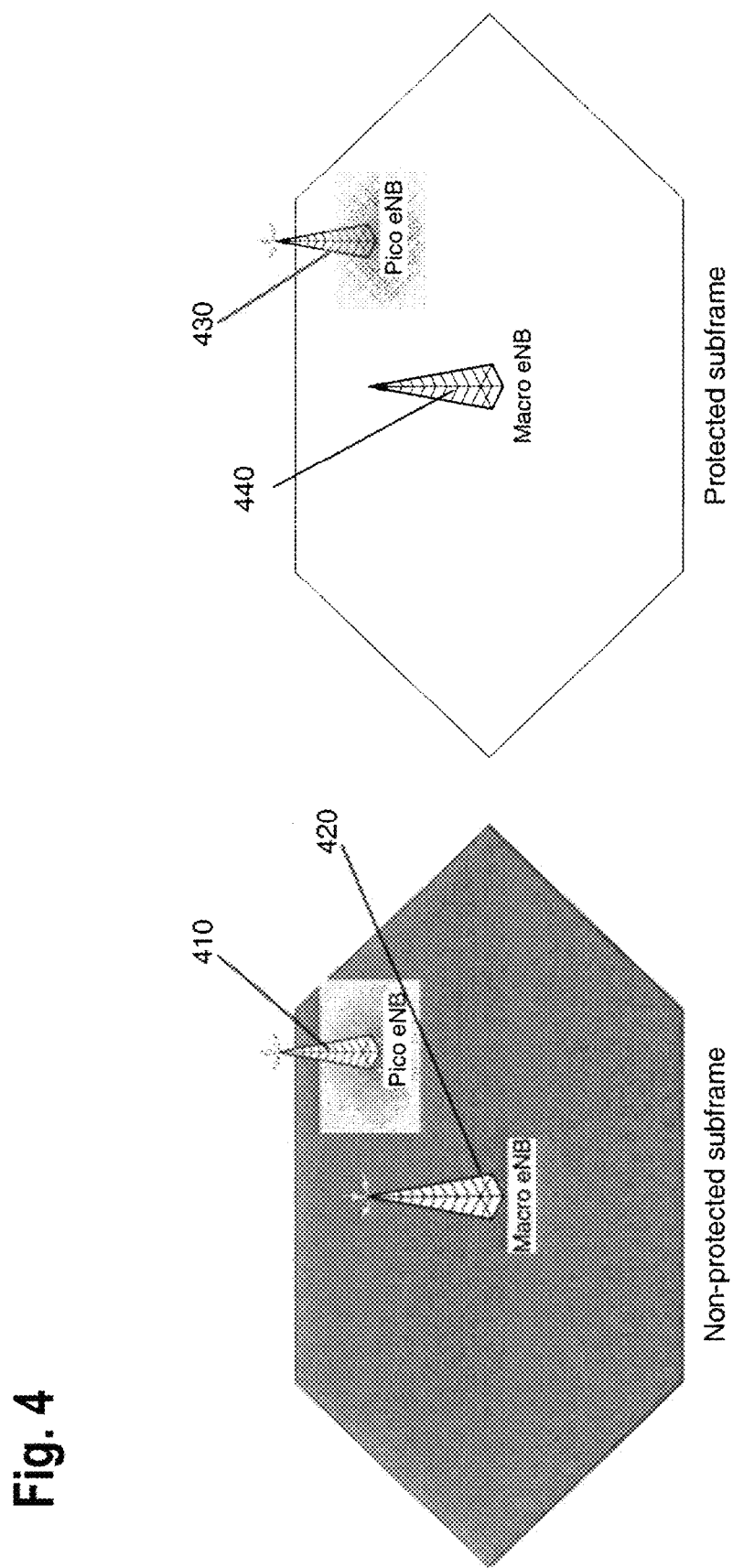
FIG. 4 is a schematic drawing illustrating transmission in multi-layer cells with a pico-cell and a macro-cell with and without employment of the protected frames.

The following paragraphs will describe various embodiments of the invention. For exemplary purposes only, most of the embodiments are outlined in relation to an (evolved) communication system according to LTE and its currently developed enhancements discussed in the Technical Background section above. In the context of LTE, the term channel state information (CSI) is generally encompassing at least one or more of the MCSI (sometimes also denoted as CQI), PMI, RI, as explained before. In the following explanation, emphasis is put to the fact that one CSI report can indicate a better or worse channel condition than another CSI report. This is most readily visible in case of the CSI containing MCSI (or CQI) as exemplified in Table 2, since the different possible entries represent a spectral efficiency where a large value is better than a small value. Nevertheless, in the following we will generally talk about "good/better" and "bad/worse" CSI values, where it should be understood that this can encompass any indicator that is part of the CSI report. Consequently the present invention is readily applicable, but not restricted, to the MCSI/CQI values.

The 3GPP TS 25.214 in Table 7A-7K, which is also provided below as Table 5, enables signalling of an additional "reference power adjustment" in the channel quality information reports.

TABLE 5

| CQI value | Transport Block Size | Modulation | Reference power adjustment Δ |
|---|---|---|---|
| 0 | N/A | | |
| 1 | 137 | QPSK | 0 |
| 2 | 173 | QPSK | 0 |
| 3 | 233 | QPSK | 0 |
| 4 | 317 | QPSK | 0 |
| 5 | 377 | QPSK | 0 |
| 6 | 461 | QPSK | 0 |
| 7 | 650 | QPSK | 0 |
| 8 | 792 | QPSK | 0 |
| 9 | 931 | QPSK | 0 |
| 10 | 1262 | QPSK | 0 |
| 11 | 1483 | QPSK | 0 |
| 12 | 1742 | QPSK | 0 |
| 13 | 2279 | QPSK | 0 |
| 14 | 2583 | QPSK | 0 |
| 15 | 3319 | QPSK | 0 |
| 16 | 3565 | 16-QAM | 0 |
| 17 | 4189 | 16-QAM | 0 |
| 18 | 4664 | 16-QAM | 0 |
| 19 | 5287 | 16-QAM | 0 |
| 20 | 5887 | 16-QAM | 0 |
| 21 | 6554 | 16-QAM | 0 |
| 22 | 7168 | 16-QAM | 0 |
| 23 | 7168 | 16-QAM | −1 |
| 24 | 7168 | 16-QAM | −2 |
| 25 | 7168 | 16-QAM | −3 |
| 26 | 7168 | 16-QAM | −4 |
| 27 | 7168 | 16-QAM | −5 |
| 28 | 7168 | 16-QAM | −6 |
| 29 | 7168 | 16-QAM | −7 |
| 30 | 7168 | 16-QAM | −8 |

This corresponds to lines 23 to 30 of Table 5. However, as can be seen in the Table, the additional power adjustments require additional channel quality information values, which decrease the efficiency of the signalling.

Commonly, as can be seen. e.g., in Table 2, the number of channel quality levels is optimized so as exactly represent the maximum number of states offered by a certain number of bits for a channel quality report. However, this usually leaves no room for further levels that are mainly useful in low-interference cases such as in protected subframes. In order to avoid adding further levels and thus increasing the number of bits necessary for signalling of the channel state (quality) information, the present invention enables varying the range of channel state information values used for the signalling.

In accordance with an embodiment of the present invention, a first channel state information value is determined from a first set of predefined channel state values and a second channel state information value is determined from a second set of predetermined channel state values. The second set is different from the first set. For instance, the first set of values may correspond to CQI indexes in Table 2. The second set may include the values of the first set, and, additionally include "virtual" values 16-19 as shown in Table 6 below. The terminology "virtual" is chose here for explanatory purposes to denote that these levels are not represented in the original first set, and are not further highlighted as "virtual" in subsequent tables. The channel state information message to be sent to the base station may then include relative channel state information calculated based on the first and the second channel state information.

TABLE 6

| CQI index | modulation | code rate × 1024 | efficiency |
|---|---|---|---|
| 0 | out of range | | |
| 1 | QPSK | 78 | 0.1523 |

TABLE 6-continued

| CQI index | modulation | code rate × 1024 | efficiency |
|---|---|---|---|
| 2 | QPSK | 120 | 0.2344 |
| 3 | QPSK | 193 | 0.3770 |
| 4 | QPSK | 308 | 0.6016 |
| 5 | QPSK | 449 | 0.8770 |
| 6 | QPSK | 602 | 1.1758 |
| 7 | 16QAM | 378 | 1.4766 |
| 8 | 16QAM | 490 | 1.9141 |
| 9 | 16QAM | 616 | 2.4063 |
| 10 | 64QAM | 466 | 2.7305 |
| 11 | 64QAM | 567 | 3.3223 |
| 12 | 64QAM | 666 | 3.9023 |
| 13 | 64QAM | 772 | 4.5234 |
| 14 | 64QAM | 873 | 5.1152 |
| 15 | 64QAM | 948 | 5.5547 |
| "Virtual 16" | | | |
| "Virtual 17" | | | |
| "Virtual 18" | | | |
| "Virtual 19" | | | |

Table 6 shows levels (channel state information values) 0 to 15 similar to the levels of Table 2. In particular, level 0 signals the "out of range" condition. In addition, virtual levels 16 to 17 are added in accordance with the present invention. The extension of the table by virtual levels may be performed, for instance, only in the protected frames. This makes sense since it is likely that only protected frames shall provide sufficient quality for utilization of the virtual levels in an exemplary case in which the virtual levels are defined for higher channel quality than level 15. In this example, the virtual levels are used in UE to determine quality better than level 15 as shown in Table 7 below. The levels 0 to 15 correspond to the same levels in Table 2 and 6. The virtual levels 16 to 19 define levels with higher channel quality than level 15 (the best level of the first set).

TABLE 7

| CQI index | modulation | code rate × 1024 | efficiency |
|---|---|---|---|
| 0 . . . 14 | . . . | . . . | . . . |
| 15 | 64QAM | 948 | 5.5547 |
| 16 | 64QAM | 988 | 5.7891 |
| 17 | 64QAM | 1023 | 5.9941 |
| 18 | 64QAM | 969 | 5.6777 |
| 19 | 64QAM | 1006 | 5.8945 |

Table 7 shows virtual levels 16 to 19 for indicating channel quality better than channel quality associated with level 15. However, the virtual levels are not necessarily ordered ascendant according to the channel quality, which they designate. In general, the present invention is not limited to sets (first and/or second) with levels ordered according to the corresponding channel quality. In Table 7, the highest channel quality is signaled by the virtual level 17. This approach provides advantages which will be described later with reference to FIG. 5.

However, the present invention is not limited to signalling only the better quality in the virtual levels and virtual levels may be defined also to designate quality levels lower than the level with the best quality in the first set of channel state information values. This may be used in other scenarios irrespectively of the deployment of the heterogeneous network.

The advantage of providing the virtual levels in this embodiment is that the virtual level need not be directly reported. The first set of CSI values only contains 16 values, corresponding to 4 bits necessary for their signalling. The second set in accordance with Table 6 and (or in one embodiment as in Table 7) now contains 20 values. However, no additional bits are necessary to signal these values since the second CSI values are signaled differentially to the values of the first set of CSI values. In this way, the range of quality state information values which may be reported is increased without increasing the necessary signalling overhead. There is also no need to increase the number of bits necessary to signal the differences. Reference is made to LTE-related examples in the background section above, in particular, to Table 3 and 4 and the description of subband differential MCSI offset level, differential MSCI offset level and the spatial differential report.

Figure 5:
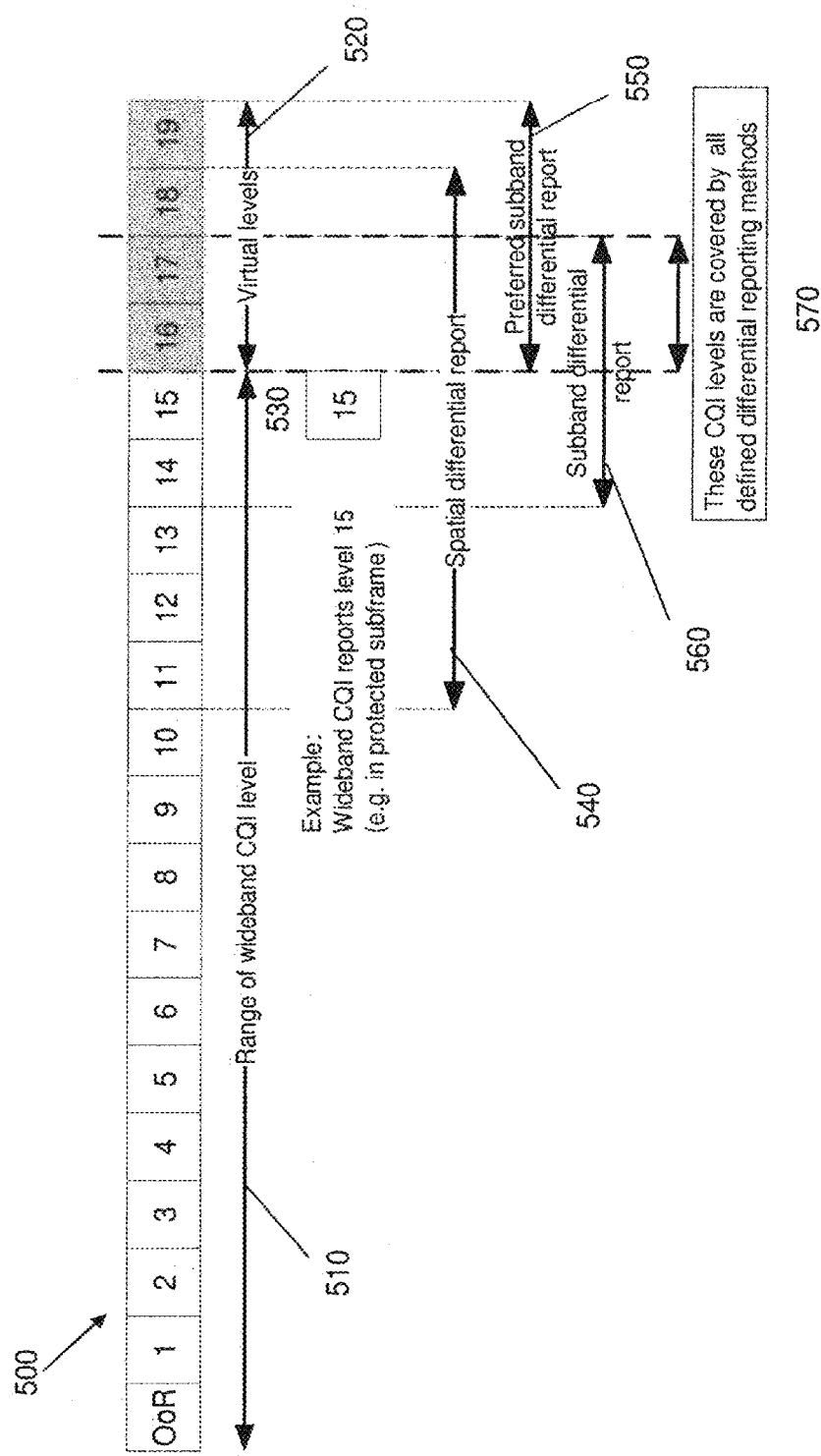
FIG. 5 is a schematic drawing illustrating channel state information value set (range) according to an embodiment of the present invention.

FIG. 5 illustrates how the already existing values of the subband differential MCSI offset level, differential MSCI offset level and the spatial differential report may be used to increase the range of the CSI values. The channel state information values (levels) 500 of the second set correspond to Table 6 or Table 7. The value "OoR" designates the "Out of Range" value, values 1 to 15 are the values of the first set corresponding also to Table 2 and values 16 to 19 are the virtual values. In this example, the first set 510 corresponds to the channel quality information (CQI) values employed for determining and signalling of the wideband CQI. The second set 500 is composed of the first set 510 and the virtual levels 520. Level 530 illustrates a scenario in which wideband CQI report indicates value 15, which is the highest value in the first set and also indicates the highest channel quality among the values available within the first set. This scenario is more likely to happen, in particular, in case of a dominant interfering cell employing protected frames to reduce the inter-cell interference it generates in those subframes.

When sending the subband differential MCSI offset report as shown in Table 3, the subband differential MCSI offset level may be −1 to 2 with respect to the wideband report. Since in this case the wideband value is 15, virtual levels 16 and 17 as well as levels 14 and 15 of the first set may be reported—as indicated in FIG. 5 by arrow 560.

When sending the differential MSCI offset values as shown in Table 4, offset of at most 4 levels may be added to the wideband CSI value. This results in possible reporting of virtual levels 16 to 19 as illustrated by an arrow 550 in FIG. 5.

When sending the spatial differential report, the difference range is from −4 to +3, resulting in the possible reporting of three virtual levels 16 to 18 as indicated in FIG. 5 by the arrow 540.

As can be seen by comparing the possibly indicated virtual levels used for signalling the subband differential MCSI offset level, differential MSCI offset level and the spatial differential report, all of these schemes include virtual levels 16 and 17 illustrated by arrow 570 in FIG. 5. Therefore, it is advantageous to reserve one of these common levels for signaling the maximum channel quality within the second set. Therefore, Table 7 illustrates virtual level 16 having higher spectral efficiency (corresponding to better channel quality) than level 15, virtual level 17 having higher efficiency than level 16, virtual level 18 with efficiency higher than level 15 but lower than other virtual levels, and virtual level 19 with efficiency higher than virtual level 16, but lower than virtual level 17. Thus, channel state information values 0 to 17 of the second set in this case are ordered ascendant according to the channel quality, while virtual levels 18 and 19 provide a sub-sample channel quality points in order to further refine the granularity. Such an arrangement is beneficial since it enables common usage of virtual levels 16 and 17 by all differential signalling schemes and thus enables to signal the same maximum channel quality. The remaining virtual levels may then be used for refining the quality intervals since they do no require any further signalling overhead. It should be noted that for the purpose of this invention, it is not relevant if virtual level 18 represents a higher or lower efficiency than virtual level 19; virtual level 18 might in fact even be used to create sub-sampling point between levels 14 and 15, since level 18 is the largest representable value in case that the wideband level is 14.

Accordingly, a user equipment is allowed to report differential values indicating CQI levels higher than 15. Due to the frequency-selectivity of the channel (a channel may have very different quality at different frequencies), the approach of the present invention is particularly suitable for the subband channel state information signalling. Even when spatial channel and interference does not fluctuate so much, the present invention may provide also benefits for signalling the spatial differential values. In general, the present invention is not limited to these particular examples. As is clear to those skilled in the art, this embodiment may be employed in any differential channel quality signalling scheme, which transmits an absolute value from a first range and a differential value which, when added to the absolute value, indicates levels from another range.

The above example was explained with reference to LTE system, for which 4 additional virtual levels are present in the second set compared to the first set. This is because the maximum difference that can be represented by any differential report is +4 levels, as also indicated by arrow 550 and Tables 3, 4 and 4a. However, the number of virtual levels may be different as a result of different possible differential values that can be represented. In this embodiment of the present invention, the number of virtual levels is determined by the maximum number of differential levels which may be added to the maximum level of the first set. In another embodiment of the present invention, the number of virtual levels is determined by the number of levels that are attainable by all differential reports. In the current example and with reference to FIG. 5, this would be equivalent to only levels 16-17 illustrated by arrow 570.

The virtual levels are only implicitly reported as an effect of the differential reporting with respect to a high absolute channel quality information level. Thus, the virtual levels are mainly relevant for environments with a very high channel quality such for UEs connected to a pico-cell during protected frames of an interfering macro cell.

In the previous examples, the virtual levels were defined by means of the spectral efficiency (cf. Table 7). However, the present invention is not limited thereto and the virtual levels may be defined, for instance by smaller target BLER (block error rate) than for one or more levels in the first set, as illustrated in the following Table 8. In Table 7, the code rate for the virtual levels varied. In Table 8, the code rate is fixed, but the target BLER is reduced corresponding to the assumption of the better channel quality. The target BLER for the virtual levels is preferably set to be smaller than the target BLER for the highest level in the first set, i.e., in the context of Table 8 the target BLERs are smaller than that of level 15, which is defined as 10%. Instead of giving the target BLER as an absolute number as shown in Table 8, it could be identified as a difference or ratio compared to the target BLER identified for the largest level in the first set.

TABLE 8

| CQI index | modulation | code rate × 1024 | efficiency |
| --- | --- | --- | --- |
| 0 ... 14 | ... | ... | ... |
| 15 | 64QAM | 948, BLER = 10.0% | 5.5547 |
| 16 | 64QAM | 948, BLER = 2.0% | 5.5547 |
| 17 | 64QAM | 948, BLER = 0.1% | 5.5547 |
| 18 | 64QAM | 948, BLER = 5.0% | 5.5547 |
| 19 | 64QAM | 948, BLER = 1.0% | 5.5547 |

Another possibility of defining virtual levels is defining them by means of a power margin with respect to the highest CSI level in the first set (here level 15). An example of this approach is shown in Table 9. The virtual levels are associated with power margin to be added to the highest level in the first set (level 15, 0 dB). Alternatively, the margin could be given not as a dB value but as a difference or ratio in the linear domain.

TABLE 9

| CQI index | power margin vs. level 15 |
| --- | --- |
| 0 ... 14 | N/A |
| 15 | 0 dB |
| 16 | +6 dB |
| 17 | +12 dB |
| 18 | +3 dB |
| 19 | +9 dB |

Summarizing, in the state of the art approach, the first set and the second set are equal. In contrast, the present invention exploits the signalling channel possibilities by employing different sets of channel state information values.

Figure 6:
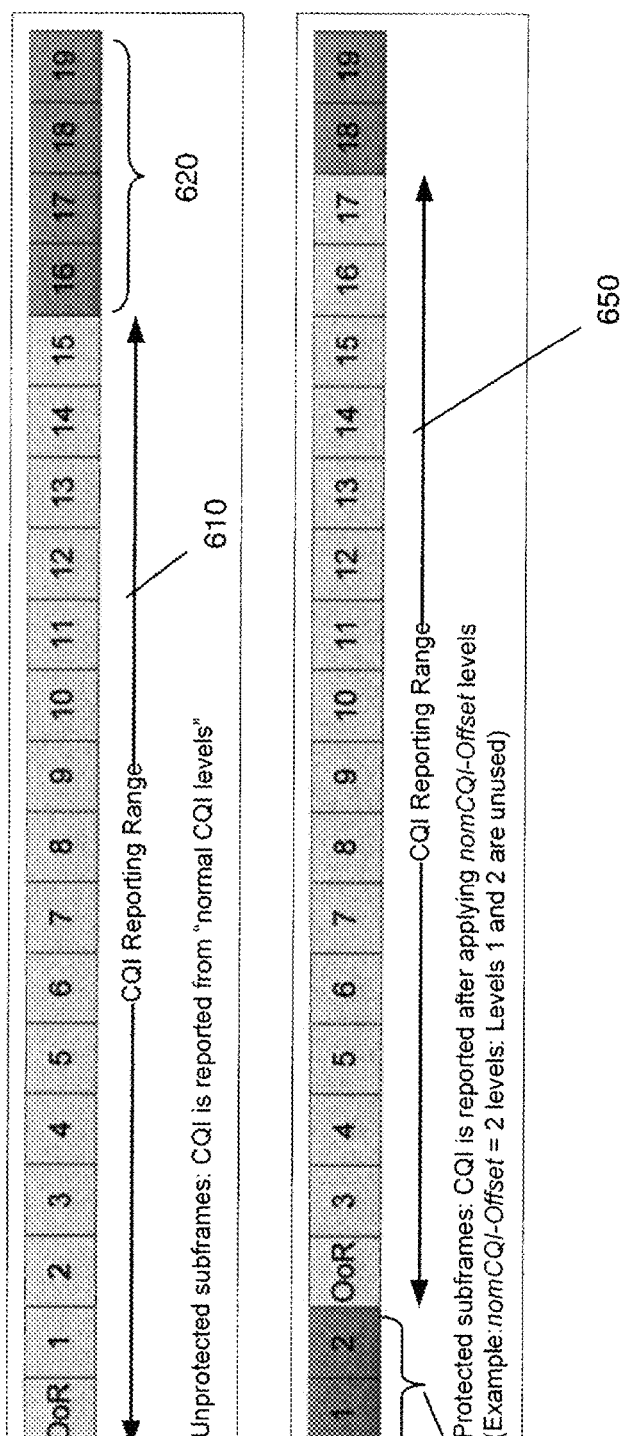
FIGS. 6A and 6B are schematic drawings illustrating channel state information reporting using an offset value according to an embodiment of the present invention.

In accordance with another embodiment of the present invention, a set of channel state information/channel quality information values may be configurable. In particular, an additional offset parameter (for instance a "nomCQI-Offset") may be specified and signaled to the user equipment. The offset parameter may be set and signaled by the base station. The UE receives the offset parameter and applies the offset when determining the channel state information to be reported. This is shown in FIG. 6. FIG. 6A illustrates the first set of CSI values 610 and the virtual values 620. The first set 610 values start with the level 2="OoR" signalling an out of range value and continues with levels 1 to 15. This corresponds to the example illustrated in FIG. 5 and in Table 7. FIG. 6B illustrates the first set 650 after applying the offset. Accordingly, the first set of CSI values in the first set is now formed by the 2=OoR value and by the levels 3 to 17. In this example, the first set is defined by a "sliding window" with a predefined number of values. The predefined number of values in FIG. 6 is always 16, so the offset parameter nomCQI-Offset indicates the position of the sliding window. As can be seen in FIG. 6, after applying the offset, the lowest represented channel state information index in the shifted first set indicates Out of Range (OoR).

The offset parameter nomCQI-Offset represents offset in terms of a number of CSI levels in the look-up table of the CSI levels (as a function of the measured signal to interference and noise ratio (SINR)) and the reported CQI level. This enables defining a 16-level wide window within a 20-level large table (set) of possible CSI values.

Additional virtual CQI levels could be defined between OoR and the CQI level 1. However, such CSI virtual values would signal a very small data rate capacity. The parameter nomCQI-Offset could alternatively represent an offset in dB between measured SINR and the CQI lookup-table threshold values, or an offset for the required target BLER. For instance, if without nomCQI-Offset the target BLER of a CSI level is 10%, then the target BLER for that CSI level is modified to, e.g., 10%+nomCQI-Offset, or alternatively to 10%*nomCQI-Offset.

The offset is preferably applied only to CSI reports for the protected subframes. However, the present invention is not limited thereto and, in general, may be applicable also in other configurations.

The signalling of the channel state information values of the present invention may be also used to transmit different codewords. Accordingly, the first channel state information is determined for a first codeword, the second channel state information is determined for a second codeword, and the relative channel state information is calculated as a difference between the first channel state information value and the second channel state information value. The codewords may then be mapped (over mapping to layers) on different antennas/beams.

FIG. 6B shows the first set of values 650 which may be used for determining the channel state information. These correspond to the levels 2=OoR, 3, 4 . . . , 15, 16, 17. In particular, the signaled bits shall still remain in the range of 0 to 15, corresponding to the 4 bits for signalling. However, now the shifted range 650 of 16 levels OoR, 3, 4, . . . . 15, 16, 17 is mapped onto these values. As is clear to those skilled in the art. FIG. 6 only represents an example of the approach. In general, the length of the first set as well as the number of additional virtual levels—and consequently also the supported offset—may vary. It is noted that this approach may be employed irrespectively of whether a differential CSI signaling is employed and irrespectively of the size/contents of the second set.

However, it may be beneficial to combine this approach with the possibility to use the relative (differential) signalling. Accordingly, a first CSI value is determined from the first set given by the offset parameter. The second CSI value is determined from the second set larger than the first set. The second CSI value is then coded as a difference between the first value and a second value. When the first value, signaled as an absolute (not differential) value, is the lowest or the highest index in the first set, then the second value may de determined from the extended second range (extended by virtual values) as already illustrated and described with reference to FIG. 5. The extension of the range is not limited to higher indexes corresponding to better quality such as level 18 and 19 in FIG. 6B. The extension may also be in the direction of lower indexes such as for instance levels 1 and 2 in FIG. 6B. The sets do not need to be necessarily ordered according to the channel quality.

Summarizing, in this embodiment of the present invention, a first and a second set of values for channel state information signalling are defined, wherein the second set includes more values than the first set. The values in the respective sets are indexed. The first set is obtained from the second set by providing an offset which indicates start of the first set within the indexed values of the second set. The number of values in the first set is given.

In particular, the present invention may advantageously be deployed for a system with any cells that impact each other by means of an inter-cell interference. In such a communication system the transmission of data may be performed within subframes in time domain. A first base station communicating with the user equipment is tied to a first cell and a second base station creating interference to the user equipment is tied to a second cell. The subframes in the second cell may include protected subframes, in which the second base station transmits or has advertised to transmit with essentially no power. According to an embodiment of the present invention, the above described methods are applied when the channel state information reporting is performed from a terminal to the first base station for the protected subframes. When the channel state information reporting is performed to the first base station for other than protected subframes, a first and a second channel state information values in the first cell are determined, wherein the first set is equal to the second set of the channel state information values. It is noted that the present invention is also applicable to protected carriers or other kind of protected resources with respect to interference, and not limited to protected subframes in the time domain. When the cell is tied to a base station it means that the cell is served by the base station. Advertising in this context means signalling by any means that the recipient of that signal can assume that the transmission power in those subframes is reduced or that essentially no signal is transmitted by the advertiser. This can be for example realized if the second base station advertises the occurrence of protected subframes to the first base station, and where in turn the first base station configures the terminal with two different subframe-sets at least with respect to the CSI reporting behavior, where for the first subframe-set, the CSI reporting employs only CSI values from the first set of values, whereas for the second subframe-set, the CSI reporting employs CSI values from the first and the second set of values as outlined previously. Preferably, the second subframe-set corresponds to the protected subframes, or at least contains some or all or only protected subframes. Alternatively, the base station could just configure the usage of the first and second set of values for reporting through a kind of on-off switching and corresponding configuration signals and commands.

The previous examples have been described for a single carrier. However, the present invention is not limited thereto and may also be applicable to systems with carrier aggregation for different component carriers.

The previously described examples refer to "differential" signalling (reporting, coding), meaning that there is a value signaled directly (an absolute value) and values which are signaled by means of the respective differences between these values and the absolute value. However, the present invention is not limited to differences and may be applicable for any kind of relation (dependency) exploited when reporting the CSI values. For instance, the relative value to be signaled may be formed by dividing the second value by the absolute value. Another relations may be employed.

Figure 7:
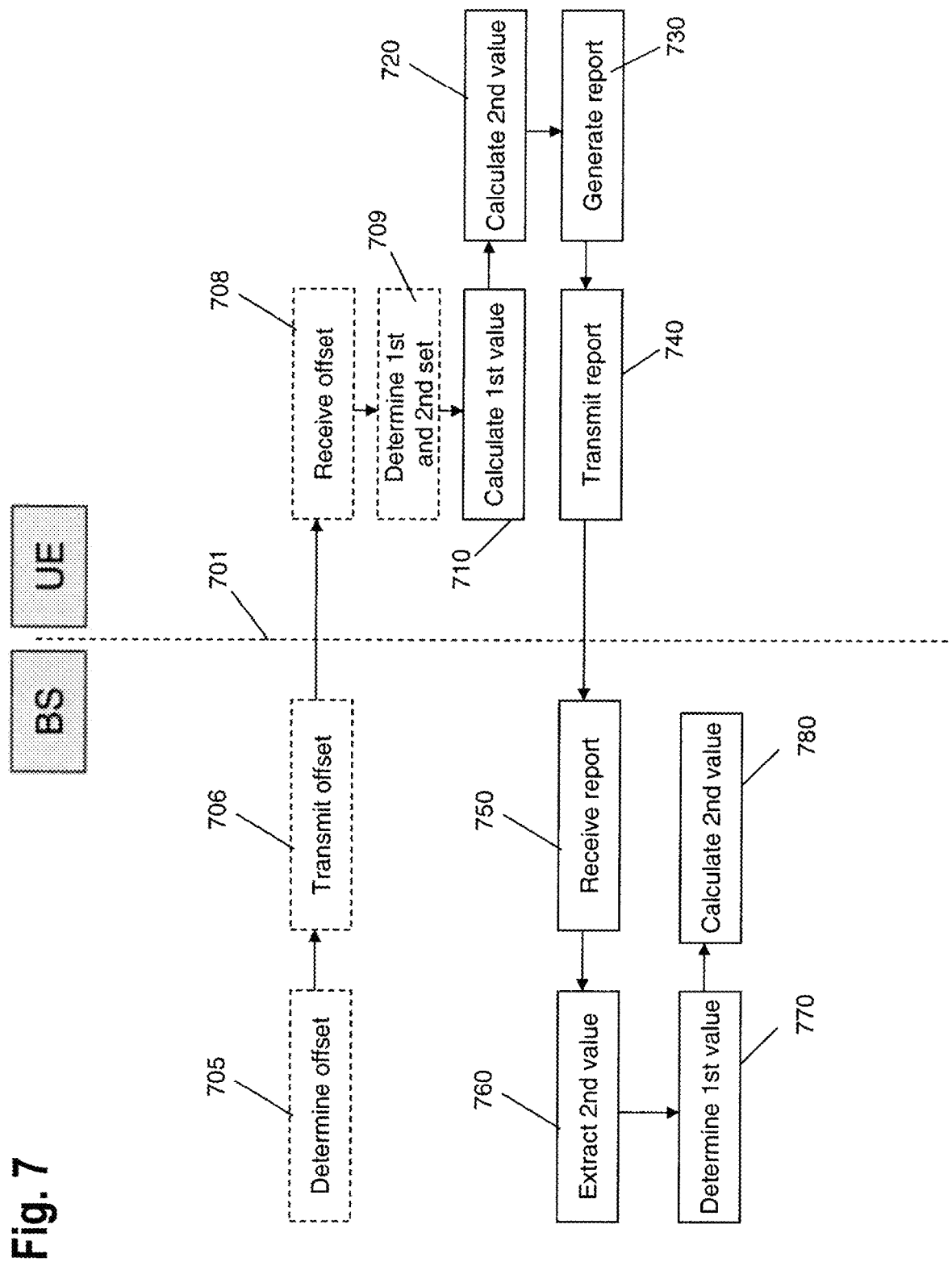
FIG. 7 is a flow diagram illustrating an example of a method for transmitting and receiving of the channel state information reports.

FIG. 7 illustrates an example of a method according to an embodiment of the present invention, to be performed at the user equipment and/or at the base station. At the base station (BS), a first-set indicator may be determined 705 for indicating which of the predetermined channel state information values from the second set form the first set of predetermined channel state values. The determined first-set indicator may then be provided (transmitted) 706 to the user equipment. The user equipment (UE). The UE may then receive 708 the offset and determine 709 the first set of the channel state information values accordingly.

In accordance with another embodiment of the present invention and possibly in combination with the above embodiment, the user equipment determines 710 a first channel state information value from a first set of predefined channel state values, determines 720 a second channel state information value from a second set of predetermined channel state values, the second set being different from the first set, and prepares 730 a channel state information message including at least a relative channel state information calculated based on the first and the second channel state information. The prepared channel state information message may then be sent (transmitted) 740 to the base station.

The base station then receives 750 the channel state information message (report) from the user equipment and extracts 760 from this received channel state information message at least relative channel state information. The base station further determines 770 a first channel state information value from a first set of predefined channel state values and determines 780 a second channel state information value from a second set of predetermined channel state values. Here, compliantly to the user equipment, the second set is different from the first set. The second channel state information value is determined 780 based on the first channel state information and the relative channel state information.

Figure 8:
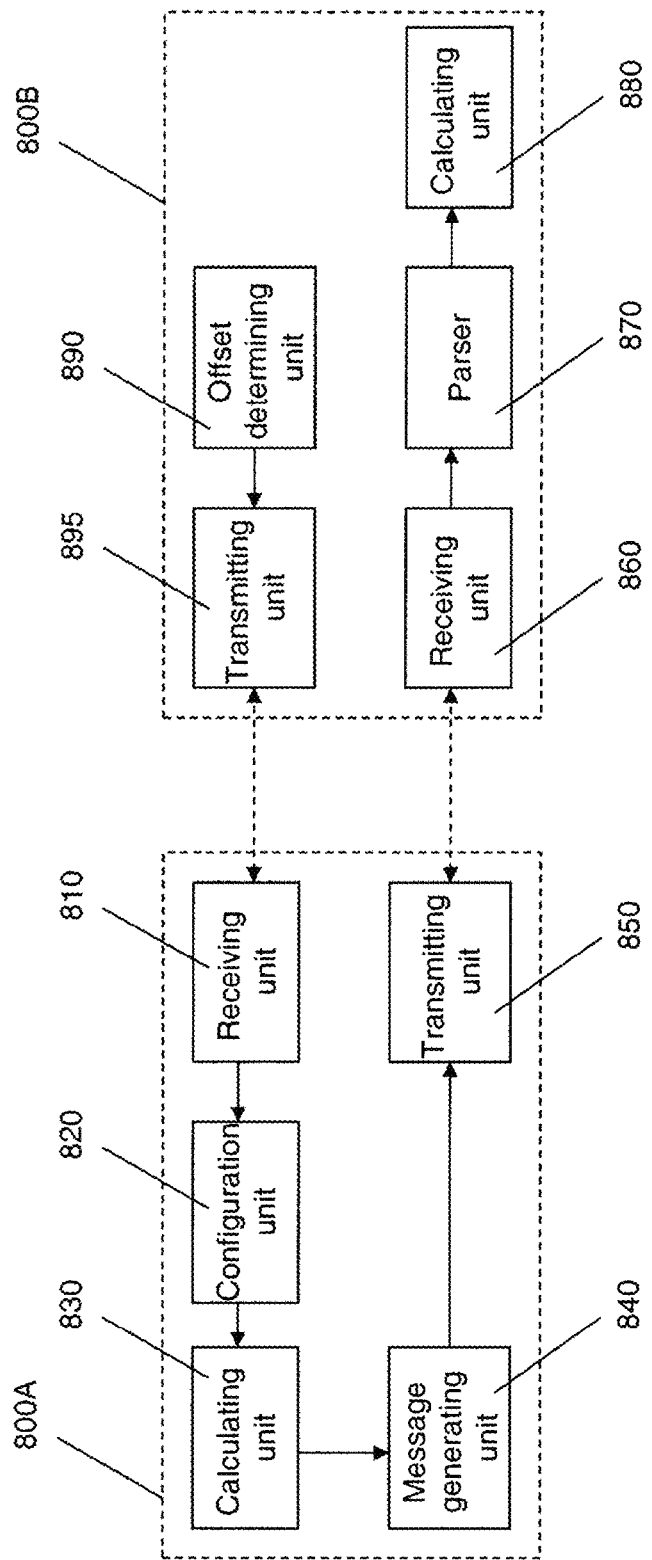
FIG. 8 is a block diagram illustrating an example apparatuses for transmitting and receiving of the channel state information reports.

FIG. 8 illustrates an example of apparatuses according to the present invention, namely of a base station and a user equipment which exchange the channel state information.

The user equipment is capable of reporting channel state information to a base station in a communication system. The user equipment 800A comprises: a calculating unit 830 for determining a first channel state information value from a first set of predefined channel state values and for determining a second channel state information value from a second set of predetermined channel state values, the second set being different from the first set, a message generating unit 840 for preparing a channel state information message including at least a relative channel state information calculated based on the first and the second channel state information, and a transmitter 850 for transmitting the channel state information message to the base station. The user equipment may also include a receiving unit 810 for receiving the first-set indicator and a configuration unit 820 for configuring the first set accordingly.

The base station is capable of receiving channel state information reports from a user equipment in a communication system. The base station includes a receiver 860 receiving for a channel state information message from the user equipment; a parsing unit 870 for extracting from the received channel state information message at least a relative channel state information, a calculation unit 880 for determining a first channel state information value from a first set of predefined channel state values, and for determining a second channel state information value from a second set of predetermined channel state values, the second set being different from the first set, based on the first channel state information and the relative channel state information. The base station may further include an offset determining unit 890 for determining the first-set indicator and a transmission unit 895 for transmitting the determined first-set indicator.

One of the advantages of the present invention for the LTE system is that the UE can report channel quality exceeding the minimum required SINR for CQI level 15. The CSI (CQI) report is generated without affecting the UE assumptions on RS-to-PDSCH power ratio. It is applicable also in case of QAM schemes and independent of CRS/DM-RS usage for demodulation. The CSI reporting payload is not affected since the number of bits necessary for CSI reporting may remain the same. The present invention does not diminish the report accuracy in non-protected subframes since the sets of reported values for the protected and unprotected frames may be selected differently.

An offset parameter, for instance nomCQI-Offset, can be configured to optimally exploit the range of the extended CQI table for any configured reporting mode. Even a wideband CQI value could be effectively reported using virtual levels 16-19 using the offset.

The eNB can interpret the enhanced CQI report for one or more of the following: Improved exploitation of multi-user diversity, scheduling of best UE/subband combination, transmission power reduction ("deboosting") and/or power sharing, more accurate link adaptation in case of assignments involving subbands with exceedingly good channel condition such as averaging of multiple CQI values reflects the actual situation better due to higher values.

The above scenarios have been described for the aperiodic CSI reporting only. However, the above-described basic principle of the invention is also applicable to periodic CSI reporting. In the periodic reporting the parameters of the CSI report may not be transmitted in the same subframe, and further other different reporting modes are defined for periodic CSI reporting. But nonetheless, basically the same feedback elements are transmitted as channel quality feedback from the UE to the eNodeB. Therefore, the periodic CSI report for component carrier #2 may also encode the component carrier status.

Another embodiment of the invention relates to the implementation of the above described various embodiments using hardware and software. It is recognized that the various embodiments of the invention may be implemented or performed using computing devices (processors) that are suitably controlled by executable instructions that cause the computing device to perform the functions according to the different embodiments of the invention described herein. A computing device or processor may for example be general purpose processors, digital signal processors (DSP), application specific integrated circuits (ASIC), field programmable gate arrays (FPGA) or other programmable logic devices, etc. The various embodiments of the invention may also be performed or embodied by a combination of these devices.

Further, the various embodiments of the invention may also be implemented by means of software modules, which are executed by a processor or directly in hardware. Also a combination of software modules and a hardware implementation may be possible. The software modules may be stored on any kind of computer-readable storage media, for example RAM, EPROM, EEPROM, flash memory, registers, hard disks. CD-ROM, DVD, etc.

Most of the embodiments have been outlined in relation to a 3GPP-based architecture of a communication system and the terminology used in the previous sections mainly relates to the 3GPP terminology. However, the terminology and the description of the various embodiments with respect to 3GPP-based architectures are not intended to limit the principles and ideas of the inventions to such systems only. Also the detailed explanations given in the Technical Background section above are intended to better understand the mostly 3GPP specific exemplary embodiments described herein and should not be understood as limiting the invention to the described specific implementations of processes and functions in the mobile communication network. Nevertheless, the improvements proposed herein may be readily applied in the architectures described in the Technical Background section. Furthermore, the concept of the invention may be also readily used in the LTE RAN currently and its enhancements (LTE-A) discussed by the 3GPP.

In the previous paragraphs various embodiments of the invention and variations thereof have been described. It would be appreciated by a person skilled in the art that numerous variations and/or modifications may be made to the present invention as shown in the specific embodiments without departing from the spirit or scope of the invention as broadly described.

Summarizing, the present invention relates to reporting the channel state information in a communication system. The channel state information is reported from the user terminal to a base station. Accordingly, the user terminal determines a first channel state information value from a first set of values (levels) and a second channel state information value from another set of values, preferably a larger set of values. Then a difference or other relative measure is calculated between the first and the second channel state information value and transmitted to the base station.

The invention claimed is:

1. A base station for receiving channel state information (CSI) from a user equipment in a communication system, the base station comprising:
    a transmitter which, in operation, transmits to the user equipment data in subframes in a time domain, the subframes including a first set of subframes and a second set of subframes that differs from the first set of subframes;
    circuitry which, in operation, configures a higher spectral efficiency CSI reporting by the user equipment for the second set of subframes than the first set of subframes, configures a first set of channel state values for the first set of subframes, and configures a second set of channel state values for the second set of subframes different from the first set of channel state values,
    wherein the first set of channel state values includes 16 index levels n (where n=0, 1, . . . 14, or 15) and the second set of channel state values includes the 16 index levels and, in a subset consisting of a defined number of highest index levels of the 16 index levels, the channel state value at index level n in the second set of channel state values has a higher spectral efficiency than the channel state value at index level n in the first set of channel state values; and
    a receiver which, in operation, receives a CSI report indicating at least one of a first CSI and a second CSI from the user equipment,
    wherein the first CSI for the first set of subframes is determined by the user equipment according to the first set of channel state values and the second CSI for the second set of subframes is determined by the user equipment according to the second set of channel state values.

2. The base station according to claim 1, wherein
the first CSI is determined by the user equipment for a frequency band, and
the second CSI is determined by the user equipment for at least one subband of the frequency band.

3. The base station according to claim 1, wherein
the first CSI is determined by the user equipment for a first codeword, and
the second CSI is determined by the user equipment for a second codeword.

4. The base station according to claim 1, wherein
the transmitter, in operation, transmits to the use equipment at least one of a first-set indicator that indicates the first set of channel state values and a second-set indicator that indicates the second set of channel state values.

5. The base station according to claim 1, wherein
the second set of channel state values includes the first set of channel state values and at least one further channel state value.

6. The base station according to claim 1, wherein
the channel state values in the second set include modulation and coding scheme indexes as well as an index specifying that a defined modulation and coding scheme is out of range.

7. The base station according to claim 6, wherein
the index specifying that the defined modulation and coding scheme is out of range is located at the first position within the second set.

8. The base station according to claim 6, wherein
the modulation and coding scheme index is an index in a table including a threshold channel quality value.

9. The base station according to claim 8, wherein
the threshold channel quality value is based on at least one of signal to interference plus noise ratio, error rate, and spectral efficiency.

10. A method, implemented in a base station, for receiving channel state information (CSI) from a user equipment, the method comprising:
transmitting to the user equipment data in subframes in a time domain, the subframes including a first set of subframes and a second set of subframes that differs from the first set of subframes;
configuring a higher spectral efficiency CSI reporting by the user equipment for the second set of subframes than the first set of subframes, configuring a first set of channel state values, for the first set of subframes, and configuring a second set of channel state values, for the second set of subframes different from the first set of channel state values, wherein the first set of channel state values includes 16 index levels n (where n=0, 1, . . . 14, or 15) and the second set of channel state values includes the 16 index levels and, in a subset consisting of a defined number of highest index levels of the 16 index levels, the channel state value at index level n in the second set of channel state values has a higher spectral efficiency than the channel state value at index level n in the first set of channel state values; and
receiving a CSI report indicating at least one of a first CSI and a second CSI from the user equipment, wherein the first CSI for the first set of subframes is determined by the user equipment according to the first set of channel state values and the second CSI for the second set of subframes is determined by the user equipment according to the second set of channel state values.

11. The method according to claim 10, wherein
the first CSI is determined by the user equipment for a frequency band, and
the second CSI is determined by the user equipment for at least one subband of the frequency band.

12. The method according to claim 10, wherein
the first CSI is determined by the user equipment for a first codeword, and
the second CSI is determined by the user equipment for a second codeword.

13. The method according to claim 10, comprising:
receiving from the base station at least one of a first-set indicator that indicates the first set of channel state values and a second-set indicator that indicates the second set of channel state values.

14. The method according to claim 10, wherein
the second set of channel state values includes the first set of channel state values and at least one further channel state value.

15. The method according to claim 10, wherein
the channel state values in the second set include modulation and coding scheme indexes as well as an index specifying that a defined modulation and coding scheme is out of range.

16. The method according to claim 15, wherein
the index specifying that the defined modulation and coding scheme is out of range is located at the first position within the second set.

17. The method according to claim 15, wherein
the modulation and coding scheme index is an index in a table including a threshold channel quality value.

18. The method according to claim 17, wherein
the threshold channel quality value is based on at least one of signal to interference plus noise ratio, error rate, and spectral efficiency.

* * * * *